US011456784B2

(12) United States Patent
Lou et al.

(10) Patent No.: US 11,456,784 B2
(45) Date of Patent: Sep. 27, 2022

(54) MULTIPLE INPUT MULTIPLE OUTPUT (MIMO) SETUP IN MILLIMETER WAVE (MMW) WLAN SYSTEMS

(71) Applicant: INTERDIGITAL PATENT HOLDINGS, INC., Wilmington, DE (US)

(72) Inventors: Hanqing Lou, Syosset, NY (US); Alphan Sahin, Westbury, NY (US); Xiaofei Wang, Cedar Grove, NJ (US); Rui Yang, Greenlawn, NY (US); Oghenekome Oteri, San Diego, CA (US); Li-Hsiang Sun, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/323,677

(22) Filed: May 18, 2021

(65) Prior Publication Data

US 2021/0273688 A1    Sep. 2, 2021

Related U.S. Application Data

(63) Continuation of application No. 16/319,077, filed as application No. PCT/US2017/043331 on Jul. 21, 2017, now Pat. No. 11,012,124.

(Continued)

(51) Int. Cl.
*H04B 7/0452* (2017.01)
*H04B 7/06* (2006.01)
*H04W 84/12* (2009.01)

(52) U.S. Cl.
CPC ......... *H04B 7/0452* (2013.01); *H04B 7/0619* (2013.01); *H04W 84/12* (2013.01)

(58) Field of Classification Search
CPC .. H04B 7/0617; H04B 7/0452; H04B 7/0619; H04W 84/12
See application file for complete search history.

(56) References Cited

U.S. PATENT DOCUMENTS

| 8,693,971 | B1 | 4/2014 | Balraj et al. |
| 8,830,965 | B2 | 9/2014 | Murakami et al. |

(Continued)

FOREIGN PATENT DOCUMENTS

| WO | 2009/027931 | 3/2009 |
| WO | 2017/143047 | 8/2017 |

(Continued)

OTHER PUBLICATIONS

Cariou et al., "SU-MIMO and MU-MIMO link access," IEEE 802.11-16/0078-00-00 (Jan. 18, 2016).

(Continued)

*Primary Examiner* — Sung S Ahn
(74) *Attorney, Agent, or Firm* — Volpe Koenig

(57) ABSTRACT

An AP/PCP may perform user selection/pairing/grouping based on a measurement of an analog transmission (e.g., signal to noise ratio (SNR) or signal to interference plus noise ratio (SINR)). The SNRs may be used, for example by the station, to determine best beams and/or beam pairs and/or worst beams and/or beam pairs. A station may feed back the best few beams and/or beam pairs for a Tx and Rx virtual antenna pair. A station may feed back the worst few beams for the Tx and Rx virtual antenna pair. The AP/PCP may receive the indication(s) and/or use the indication(s) to group the stations.

20 Claims, 20 Drawing Sheets

Related U.S. Application Data

(60) Provisional application No. 62/365,141, filed on Jul. 21, 2016.

(56) References Cited

U.S. PATENT DOCUMENTS

| | | | |
|---|---|---|---|
| 8,842,606 | B2 | 9/2014 | Denteneer et al. |
| 8,861,495 | B2 | 10/2014 | Kim et al. |
| 9,089,002 | B2 | 7/2015 | Abraham et al. |
| 9,231,681 | B2 | 1/2016 | Maltsev et al. |
| 9,912,053 | B2 | 3/2018 | Sanford et al. |
| 2013/0286960 | A1 | 10/2013 | Li et al. |
| 2015/0236774 | A1 | 8/2015 | Son et al. |
| 2015/0358995 | A1 | 12/2015 | Li et al. |
| 2016/0014811 | A1 | 1/2016 | Jauh et al. |
| 2016/0099796 | A1 | 4/2016 | Yang et al. |
| 2017/0126363 | A1 | 5/2017 | Wang et al. |
| 2017/0187435 | A1* | 6/2017 | Cariou ............... H04W 74/0816 |
| 2017/0303328 | A1* | 10/2017 | Cariou ................. H04W 76/15 |
| 2018/0092055 | A1 | 3/2018 | Cariou |
| 2020/0160614 | A1* | 5/2020 | Chen ................... G06F 3/04815 |

FOREIGN PATENT DOCUMENTS

| | | |
|---|---|---|
| WO | 2017/156315 | 9/2017 |
| WO | 2017/197189 | 11/2017 |

OTHER PUBLICATIONS

Wang et al., "11ay DL MU-MIMO BF Training and User Selection," IEEE 802.11-16/0405r1 (Mar. 13, 2016).

Agilent Technologies, "Wireless LAN and 60 GHz—IEEE 802.11ad Explained," pp. 1-28 (May 20, 2013).

Chen et al., "MAC and PHY Proposal for 802.11af," IEEE 802.11-10/0258r0 (Mar. 2010).

Cordeiro et al., "MU MIMO beamforming protocol proposal," IEEE 802.11-16/1365r0 (Nov. 2, 2016).

Cordeiro, "Specification Framework for TGay," IEEE P802.11 Wireless LANs, IEEE 802.11-15/1358r4 (Jun. 13, 2016).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).

Du et al., "Evaluation of PMI Feedback Schemes for MU-MIMO Pairing," IEEE Systems Journal, vol. 4, Issue 4, pp. 505-510 (Dec. 2010).

Halasz, "Sub 1 GHz license-exempt PAR and 5C," IEEE P802.11 Wireless LANs, IEEE 802.11-10/0001r13 (Jul. 2010).

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

IEEE P802.11ah/D5.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).

Kim et al., "802.11 WLAN: History and New Enabling MIMO Techniques for Next Generation Standards," IEEE Communications Magazine, vol. 53, No. 3 (Mar. 2015).

Lomayev et al., "Non-EDMG Part of Preamble for MIMO in 11ay," IEEE 802.11-16/XXXXr0 (802.11-16/0988r0) (Jul. 25, 2016).

Maltsev et al., "Channel Models for IEEE 802.11ay," P802.11 Wireless LANs, IEEE 802.11-15/1150r4 (Sep. 12, 2015).

Sun et al., "IEEE 802.11 TGay Use Cases," IEEE 802.11-2015/0625r2 (May 2015).

Wang et al., "11ay DL MU-MIMO BF Training and User Selection," IEEE 802.11-16/0405r0 (Mar. 13, 2016).

Yang et al., "[3.1.4 MIMO Channel Access]," IEEE P802.11 Wireless LANs, IEEE 802.11-16/1620r2 (Dec. 12, 2016).

* cited by examiner

FIG. 4

| Total Sectors in ISS | Number of RX DMG Antennas | Reserved | Poll Required | Reserved |
|---|---|---|---|---|
| B0 402 — B7 | B8 B9 404 B10 | B11 406 — B15 | B16 408 | B17 410 — B23 |
| 9 | 2 | 5 | 1 | 7 |

Bits:

FIG. 5

| Sector Select | DMG Antenna Select | SNR Report | Poll Required | Reserved |
|---|---|---|---|---|
| B0 502 — B5 | B6 504 B7 | B8 506 — B15 | B16 508 | B17 510 — B23 |
| 6 | 2 | 8 | 1 | 7 |

Bits:

MULTIPLE INPUT MULTIPLE OUTPUT (MIMO) SETUP IN MILLIMETER WAVE (MMW) WLAN SYSTEMS

CROSS-REFERENCE TO RELATED APPLICATION

This application is a continuation of U.S. application Ser. No. 16/319,077, filed Jan. 18, 2019 which claims the benefit of PCT/US2017/043331, filed Jul. 21, 2017 which claims the benefit of U.S. Provisional Patent Application No. 62/365,141, filed Jul. 21, 2016, the contents of which is incorporated by reference.

BACKGROUND

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more wireless transmit receive units (WTRUs), e.g., stations (STAs), may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs. In certain WLAN systems, STA to STA communication may take place. In certain WLAN systems an AP may act in the role of a STA. Beamforming may be used by WLAN devices. Current beamforming techniques may be limited.

SUMMARY

Systems, methods, and instrumentalities are disclosed for setting up a multiple input multiple output (MIMO) frame for MIMO transmission.

An AP/PCP may perform user selection/pairing/grouping based on a measurement of an analog transmission (e.g., signal to noise ratio (SNR) or signal to interference plus noise ratio SINR). SNR/SINRs may be acquired by analog beam training. During analog beam training, the AP may send from a virtual antenna of the AP one or more analog transmissions. The virtual antenna of the AP may transmit via one or more analog beams (e.g., a transmission per beam). A station may receive via a virtual antenna of the station the one or more analog transmissions. The virtual antenna of the station may receive the one or more analog transmissions via one or more analog beams. For example, a beam of a virtual antenna of the station may receive some or all analog transmissions from the AP. An analog transmission of the one or more analog transmissions may be communicated from a beam of a virtual antenna of the AP to a beam of a virtual antenna of the station. The beam of the virtual antenna of the AP and the beam of the virtual antenna of the station may form a TX and RX beam pair. The beam of the virtual antenna of the AP may be the TX beam in the beam pair. The beam of the virtual antenna of the station may be the RX beam in the beam pair. Different TX and RX beam pairs may be associated with SNRs. SNRs may be measured, for example by the station, based on the analog transmission communicated between the TX and RX beam pair.

The SNRs may be used, for example by the station, to determine best beams and/or beam pairs and/or worst beams and/or beam pairs. In an example, an SNR threshold may be used for characterizing the beams and/or beam pairs. The beams and/or beam pairs associated with an SNR that is greater or equal to the SNR threshold may be characterized as best beams and/or beam pairs. The beams and/or beam pairs associated with an SNR that is less than the SNR threshold may be characterized as worst beams and/or beam pairs.

A station may feed back the best few beams and/or beam pairs for a Tx and Rx virtual antenna pair. A station may feed back the worst few beams for the Tx and Rx virtual antenna pair. For example, the station may feed back the best and/or the worst few beams to the AP/PCP via an indication(s). The indication(s) may include a MU MIMO set up frame(s).

The AP/PCP may receive the indication(s) and/or use the indication(s) to group the stations. For example, the AP/PCP may receive, from one station, an indication of the best beam and/or the worst beam for the station. The AP/PCP may receive, from another station, an indication of the best beam an/or the worst beam for the other station. The AP/PCP may determine based on one or more of the indications for multiple stations that the best beam for one station may be among the worst beams for another station. The AP/PCP may determine to group the two stations for transmissions (e.g., DL MU-MIMO transmissions). The AP/PCP may indicate to both stations about the grouping. In the example, the AP/PCP may indicate to both stations about the allocation of the respective beam/RF chain/virtual antenna allocation to the respective station.

BRIEF DESCRIPTION OF THE DRAWINGS

A more detailed understanding of the embodiments disclosed herein may be had from the following description, given by way of example in conjunction with the accompanying drawings.

FIG. 4 is an exemplary SSW feedback field in a SSW frame when not transmitted as part of an ISS.

FIG. 5 is an exemplary SSW feedback field in a SSW frame when transmitted as part of an ISS

DETAILED DESCRIPTION

Figure 1:
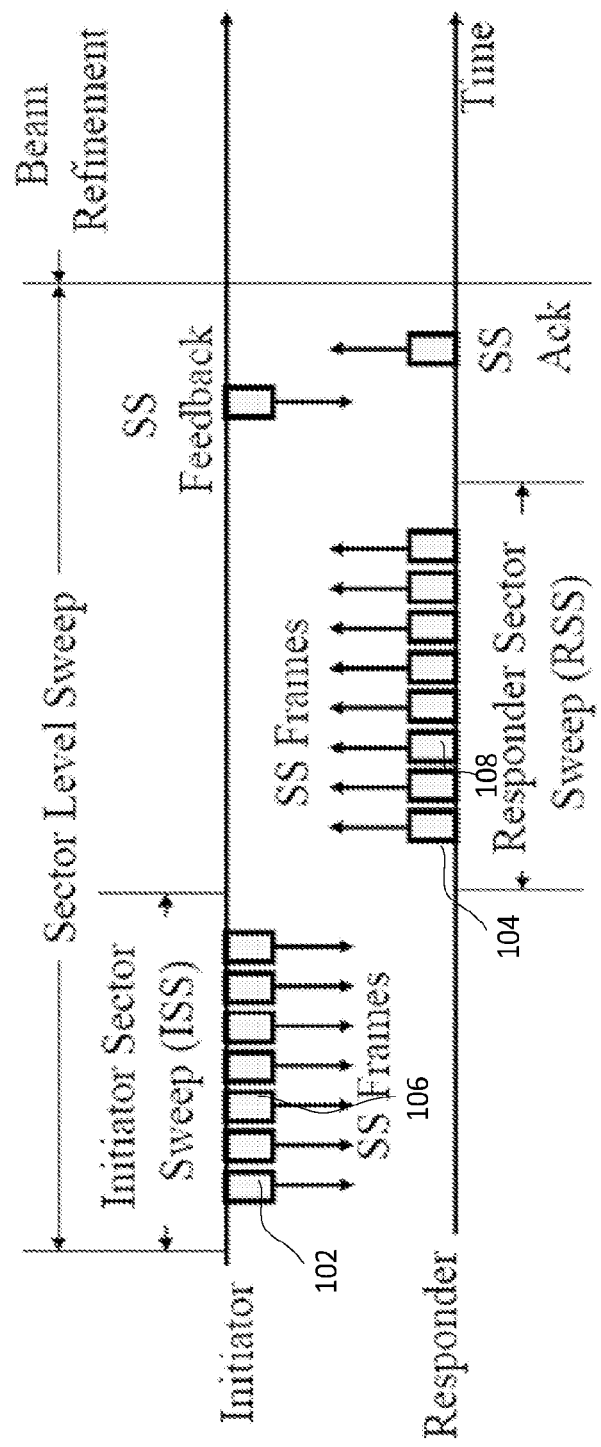
FIG. 1 is an exemplary sector level sweep (SLS) training.

A detailed description of illustrative embodiments may now be described with reference to the various Figures. Although this description provides a detailed example of possible implementations, it should be noted that the details are intended to be exemplary and in no way limit the scope of the examples described herein.

A Wireless Local Area Network (WLAN) may have multiple modes of operation, such as an Infrastructure Basic Service Set (BSS) mode and an Independent BSS (IBSS) mode. A WLAN in BSS mode may have an Access Point (AP/PCP) for the BSS. One or more stations (STAs) may be associated with an AP/PCP. An AP/PCP may have access or an interface to a Distribution System (DS) or another type of wired/wireless network that carries traffic in and out of a BSS. Traffic to STAs that originates from outside a BSS may arrive through an AP/PCP, which may deliver the traffic to the STAs. Traffic originating from STAs to destinations outside a BSS may be sent to an AP/PCP, which may deliver the traffic to the respective destinations. Traffic between STAs within a BSS may be sent through an AP/PCP, e.g., from a source STA to the AP/PCP and from the AP/PCP to the destination STA. Traffic between STAs within a BSS may be peer-to-peer traffic. Peer-to-peer traffic may be sent directly between the source and destination STAs, for example, with a direct link setup (DLS) using an 802.11e DLS or an 802.11z tunneled DLS (TDLS). A WLAN in IBSS mode may not have an AP/PCP, and/or STAs may communicate directly with each other. An IBSS mode of communication may be referred to as an "ad-hoc" mode of communication.

An AP/PCP may transmit a beacon on a fixed channel (e.g., the primary channel), for example, in an 802.11ac infrastructure mode of operation. A channel may be, for example, 20 MHz wide. A channel may be an operating channel of the BSS. A channel may be used by the STAs, for example, to establish a connection with an AP/PCP. A channel access mechanism in an 802.11 system is Carrier Sense Multiple Access with Collision Avoidance (CSMA/CA). A STA, including an AP/PCP, may sense a primary channel, for example, in a CSMA/CA mode of operation. A STA may back off, for example, when a channel is detected to be busy so that a (e.g., only one) STA may transmit at a time in a given BSS.

High Throughput (HT) STAs may use, for example, a 40 MHz wide channel for communication, e.g., in 802.11n. A primary 20 MHz channel may be combined with an adjacent 20 MHz channel to form a 40 MHz wide contiguous channel.

Very High Throughput (VHT) STAs may support, for example, 20 MHz, 40 MHz, 80 MHz, and 160 MHz wide channels, e.g., in 802.11ac. 40 MHz and 80 MHz channels may be formed, for example, by combining contiguous 20 MHz channels. A 160 MHz channel may be formed, for example by combining eight contiguous 20 MHz channels or by combining two non-contiguous 80 MHz channels, which may be referred to as an 80+80 configuration. An 80+80 configuration may be passed through a segment parser that divides data into two streams, for example, after channel encoding. IFFT and time domain processing may be performed, for example, on a (e.g., each) stream separately. Streams may be mapped onto two channels. Data may be transmitted on the two channels. A receiver may reverse a transmitter mechanism. A receiver may recombine data transmitted on multiple channels. Recombined data may be sent to the Media Access Control (MAC).

Sub 1 GHz (e.g., MHz) modes of operation may be supported, for example, by 802.11af 802.11ah. Channel operating bandwidths and carriers may be reduced, for example, relative to bandwidths and carriers used in 802.11n and 802.11ac. 802.11af may support 5 MHz, 10 MHz, and 20 MHz bandwidths in a TV White Space (TVWS) spectrum. 802.11ah may support 1 MHz, 2 MHz, 4 MHz, 8 MHz, and 16 MHz bandwidths in non-TVWS spectrum. An example of a use case for 802.11ah may be support for Meter Type Control (MTC) devices in a macro coverage area. MTC devices may have limited capabilities (e.g., limited bandwidths) and may be designed to have a very long battery life.

WLAN systems (e.g., 802.11n, 802.11ac, 802.11af, and 802.11ah systems) may support multiple channels and channel widths, such as a channel designated as a primary channel. A primary channel may, for example, have a bandwidth equal to the largest common operating bandwidth supported by STAs in a BSS. Bandwidth of a primary channel may be limited by a STA that supports the smallest bandwidth operating mode. In an example of 802.11ah, a primary channel may be 1 MHz wide, for example, if there are one or more STAs (e.g., MTC type devices) that support a 1 MHz mode while an AP/PCP and other STAs may support a 2 MHz, 4 MHz, 8 MHz, 16 MHz, or other channel bandwidth operating modes. Carrier sensing and NAV settings may depend on the status of a primary channel. As an example, some or all available frequency bands may be considered busy and remain idle despite being available, for example, when a primary channel has a busy status due to a STA that supports a 1 MHz operation mode transmitting to an AP/PCP on the primary channel.

Available frequency bands may vary between different regions. As an example, in the United States, available frequency bands used by 802.11ah may be 902 MHz to 928 MHz. As another example, in Korea, available frequency bands may be 917.5 MHz to 923.5 MHz. As another example, in Japan, available frequency bands may be 916.5 MHz to 927.5 MHz. The total bandwidth available for 802.11ah may be 6 MHz to 26 MHz depending on the country code.

802.11ac may support downlink Multi-User MIMO (MU-MIMO) transmission to multiple STAs in the same symbol's time frame, e.g. during a downlink Orthogonal frequency-division multiplexing (OFDM) symbol. MU-MIMO transmission may improve spectral efficiency. 802.11ah may support downlink MU-MIMO. Downlink MU-MIMO may use the same symbol timing to multiple STAs and the waveform transmissions to the multiple STAs may not interfere with each other. One or more STAs in MU-MIMO transmission with an AP/PCP may use the same channel or band, which may limit the operating bandwidth to a selected channel width (e.g., the smallest channel bandwidth that is supported by the one or more STAs in MU-MIMO transmission with the AP/PCP).

802.11ad is an amendment to the WLAN standard, which specifies the medium access control (MAC) and physical (PHY) layers for very high throughput (VHT) in the 60 GHz band. 802.11ad may support data rates up to 7 Gbits/s. 802.11ad may support three different modulation modes. 802.11ad may support control of PHY with single carrier and spread spectrum. 802.11ad may support single carrier. PHY. 802.11ad may support OFDM PHY. 802.11ad may use 60 GHz unlicensed band, which may available globally. At 60 GHz, the wavelength may be 5 mm, which may make compact and competitive antenna or antenna arrays possible. A compact and competitive antenna may create narrow radio frequency (RF) beams at transmitter and receiver, which may effectively increase the coverage range and/or reduce the interference.

The frame structure of 802.11ad may facilitate beamforming training (e.g., discovery and tracking). The beamforming (BF) training protocol may include two or more components: a sector level sweep (SLS), a beam refinement protocol (BRP), and/or the like. The SLS may be used for transmitting beamforming training. The BRP may enable receive beamforming training and/or iterative refinement of both the transmit and receive beams.

MIMO transmissions, including both SU-MIMO and MU-MIMO, may not be supported by 802.11ad.

FIG. 1 illustrates an exemplary sector level sweep (SLS) training. SLS training may be performed using a Beacon frame and/or a sector sweep (SSW) frame. When a Beacon frame is utilized, an AP/PCP may repeat the Beacon frame with multiple beams/sectors within a (e.g., each) Beacon interval (BI). For example, an AP/PCP may repeat the Beacon frame in the SS frame 102 and the SS frame 106. Multiple STAs may perform BF training simultaneously. For example, a STA may respond via frame 104, and another STA may respond via frame 108. An AP/PCP may not sweep all the sectors/beams within one BI, for example, due to the size of the Beacon frame. A STA may need to wait multiple BIs to complete ISS training, and latency may be an issue. A SSW frame may be utilized for point-to-point BF training. A SSW frame may be transmitted using control PHY.

Figure 2:
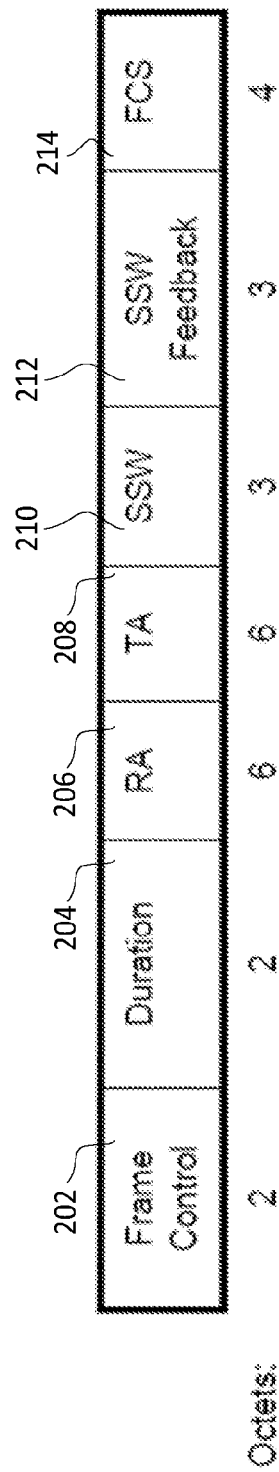
FIG. 2 is an exemplary sector sweep (SSW) frame format.

FIG. 2 illustrates an exemplary SSW frame format. The SSW frame may include one or more frame control 202 (2 octets), 204 duration (2 octets), RA 206 (6 octets), TA 208 (6 octets), SSW 210 (3 octets), SSW feedback 212 (3 octets), or FCS 214 (4 octets).

Figure 3:
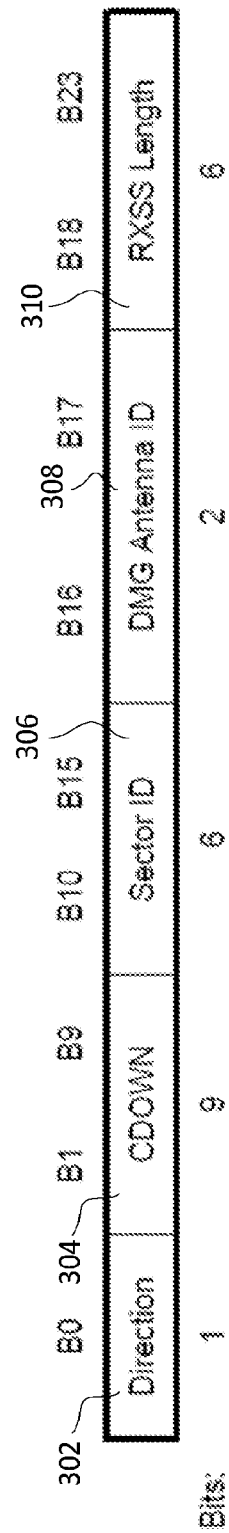
FIG. 3 is an exemplary SSW field in a SSW frame.

FIG. 3 illustrates an exemplary SSW field in a SSW frame. The SSW frame may include fields or subfields of one or more direction 302 (1 bits), CDOWN 304 (9 bits), Sector ID 306 (6 bits), DMG Antenna ID 308 (2 bits), or RXSS Length 310 (6 bits).

FIG. 4 illustrates an exemplary SSW feedback field in a SSW frame when transmitted as part of an ISS. A SSW feedback field in a SSW frame may include fields and subfields of one or more total sections in ISS 402 (9 bits), number of RX DMG antennas 404 (2 bits), reserved 406 (5 bits), poll required 408 (1 bit), and reserved 410 (7 bits).

FIG. 5 illustrates an exemplary SSW feedback field in a SSW frame when not transmitted as part of an initiator sector sweep (e.g., ISS). The SSW feedback field may include fields and subfields of one or more sector select 502 (6 bits), DMG Antenna Select 504 (2 bits), SNR Report 506 (8 bits), Poll required 508 (1 bit), or reserved 510 (7 bits).

Figure 6:
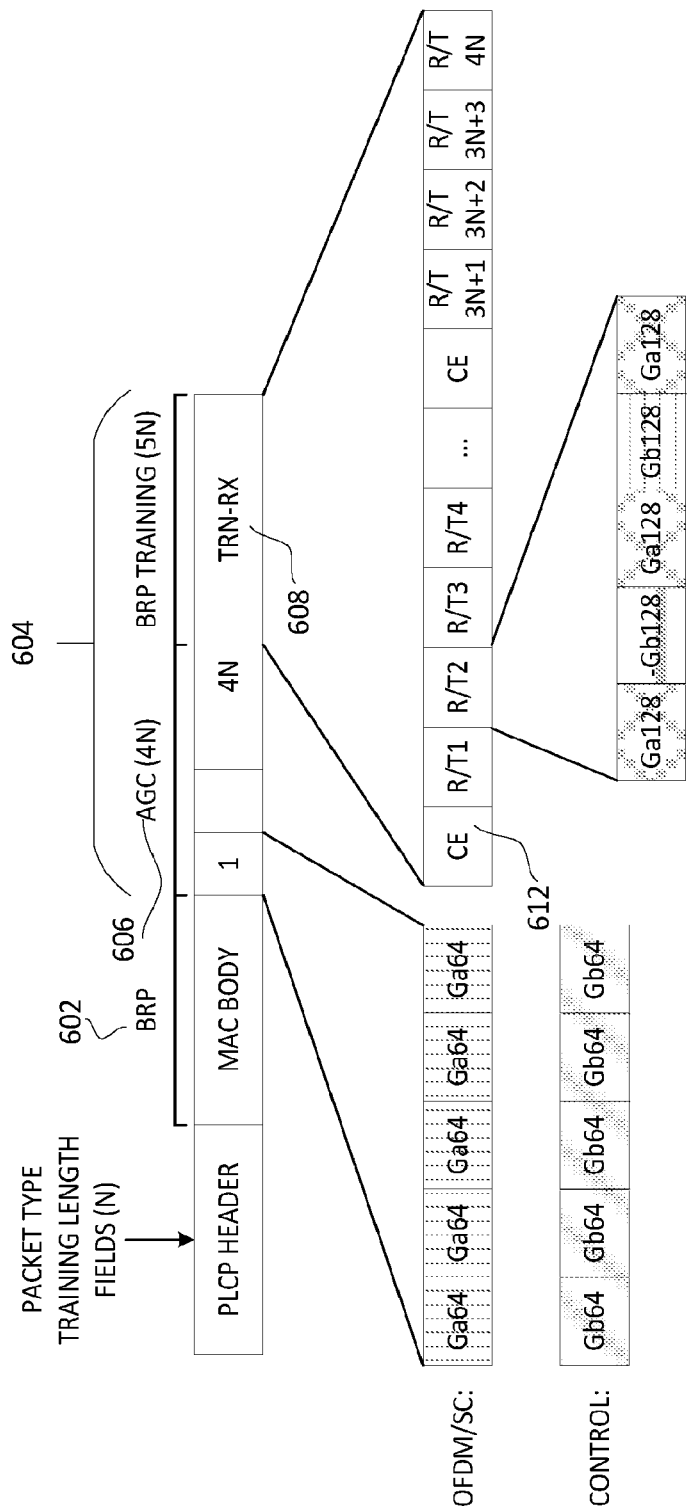
FIG. 6 is an exemplary physical Layer convergence procedure (PLCP) protocol data unit PPDU which carries beam refinement protocol (BRP) frame and training (TRN) fields.

Beam refinement may enable a STA to improve the STA's antenna configuration (e.g., or antenna weight vectors) for transmission and/or reception. Beam refinement may include using BRP packets to train the receiver and/or transmitter antenna. There may be two types of beamforming refinement protocol (BRP) packets: BRP-receiver (RX) packets and BRP-transmitter (TX) packets. FIG. 6 is an exemplary Physical Layer convergence procedure (PLCP) protocol data unit (PPDU) which carries a BRP frame and training (TRN) fields. A BRP packet 602 may be carried by a directional multi-gigabit (DMG) PPDU, for example, and may be followed by a training field 604 that includes an automatic gain control (AGC) field 606. The BRP packet 602 carried by a DMG PPDU may be followed by a transmitter or receiver training field 608 as shown in FIG. 6

A value of N, as shown in FIG. 6, may be the Training Length given in the header filed, which may indicate that the AGC has 4N subfields and that the TRN-receiver/transmitter (R/T) field has 5N subfields. The channel estimation (CE) subfield 612 may be the same as the one in the preamble (e.g., described herein). The subfields in the beam training field 604 may be transmitted using rotated π/2-Binary Phase Shift Keying (BPSK) modulation.

A BRP MAC frame may be an Action No ACK frame that includes one or more of the following fields: Category, Unprotected DMG Action, Dialog Token, BRP Request field, DMG Beam Refinement element, or Channel Measurement Feedback element 1 . . . Channel Measurement Feedback element k.

Figure 7:
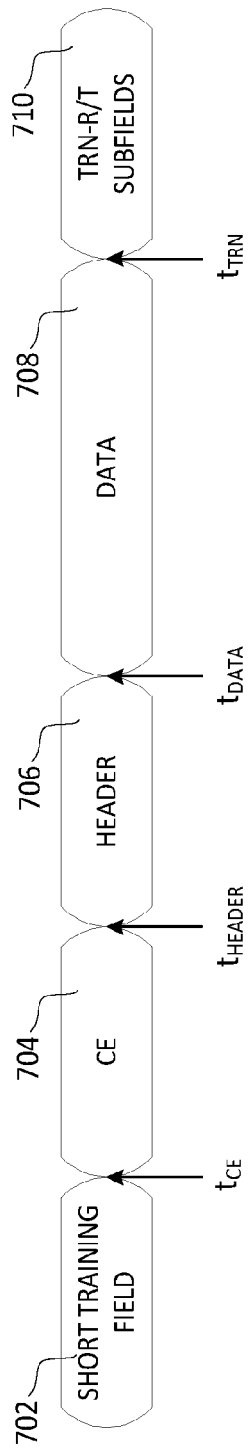
FIG. 7 is an exemplary digital multimedia broadcasting (DMB) PPDU format.

802.11ad may support four PHYs, including single carrier (SC) PHY, OFDM PHY, Control PHY, and low power SC PHY. The PHYs may share the same packet structure though the detailed designs for each field may be different. FIG. 7 is an exemplary digital multimedia broadcasting (DMB) PPDU format. The DMB PPDU format may include short training field 702, CE 704, header 706, data 708, and TRN-R/T subfields 710.

Task Group ay (TGay) may introduce modifications to both the IEEE 802.11 physical layers (PHY) and the IEEE 802,11 medium access control layer (MAC) that enables at least one mode of operation capable of supporting a maximum throughput of at least 20 gigabits per second (e.g., measured at the MAC data service access point), while maintaining or improving the power efficiency per station. TGay may introduce support for operations on license-exempt bands above 45 GHz while ensuring backward compatibility and coexistence with legacy directional multi-gigabit stations (e.g., as defined by IEEE 802.11ad-2012 amendment) operating in the same band.

802.11 ay may include mobility and/or outdoor support. 802.11 ay may operate in the same band as legacy standards and may include support for backward compatibility and coexistence with legacies in the same band. 802.11ay may include MIMO and channel bonding. In order to support MIMO transmission, multiple Phased Antenna Arrays (PAAs) or a PAA with multiple polarizations may be implemented in 802.11 ay compatible devices.

The EDMG Capability element may include the antenna polarization capability of an EDMG STA. An EDMG STA may transmit a MIMO Setup frame (e.g., request to send (RTS) or DMG clear to send (CTS)-to-self) prior to the transmission of a SU or MU MIMO PPDU. The MIMO Setup frame may indicate one or more destination STA(s) addressed by the PPDU. A MIMO Setup frame (e.g., RTS) transmission may trigger a response (e.g., DMG CTS or Acknowledgment (ACK)) from one or more destination STA(s).

Figure 8:
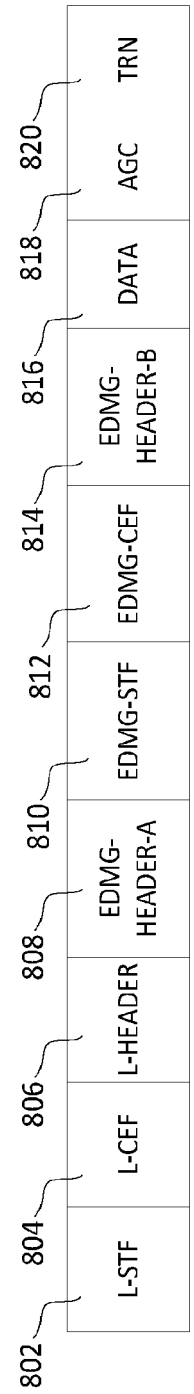
FIG. 8 is an exemplary enhanced directional multi-gigabit (EDMG) PPDU format.

FIG. 8 is an exemplary EDMG PPDU format. The EDMG PPDU format may include fields/subfields of one or more L-STF 802, L-CEF 804, L-HEADER 806, EDMG-HEADER-A 808, EDMG-STF 810, EDMG-CEF 812, EDMG-HEADER-B 814, DATA 816, AGC 818, or TRN 820.

Multiple input multiple output (MIMO) setup mechanisms may be provided. MIMO setup frame may be used for multiple user (MU)-MIMO setup frame and single user (SU)-MIMO setup frame. MIMO setup frame may (e.g., in 802.11ay) set up SU-MIMO and/or downlink (DL) MU-MIMO transmissions. With sub 6 GHz transmission, it may not be required to transmit a frame to set up MIMO transmission. With an mmW environment, transmissions may be highly directional. In a single input single output (SISO) case, a transmitter and/or a receiver may prepare (e.g., need to prepare) a transmitter and/or a receiver's Tx/Rx beams (e.g., a transmitter and/or a receiver's own fixed Tx/Rx beams which point to each other). With an MIMO transmission, beam settings may be different for different spatial/MIMO schemes. A control frame may be used to set up one or more beams at the transmitter and/or receiver side. The frame may be designed to fulfill some or all the MIMO transmission scenarios.

Unintentional beamforming may occur. When multiple streams that comprise same legacy fields (e.g., legacy short training field (STF), channel estimation field (CEF), and header) are transmitted from multiple antennas, power fluctuation (e.g., unintentional beamforming) may occur on the received signal, for example, due to a strong correlation between transmitted signals. A variation of received signal power may enable (e.g., cause) suboptimal AGC setting to decode a legacy header at a legacy device(s). This may be an issue when a STA aims at omnidirectional transmission by forming a quasi-omni antenna pattern, e.g., by changing the STA's own PAA configuration. In order to decorrelate the transmit signals, different cyclic shift may be applied to a (e.g., each) transmitted signal. An operation of applying different cyclic shift to a (e.g., each) transmitted signal may be compatible with a cyclic prefix (CP)-OFDM transmission(s), which may be addressed for a signal carrier system(s). A single carrier(s) may be adopted in IEEE 802.11ad. IEEE 802.11 ay may be compatible with 802.11ad receivers.

Channel estimation fields for multiple stream (MIMO) transmission may be used. A technology for reaching a high throughput (e.g., more than 20 Gbps throughput) may comprise using multiple stream transmission (e.g., SU-MIMO) via multiple transmit antennas. Mutually orthogonal channel estimation fields may be constructed, one for a (e.g., each) transmit antenna, for example, to enable SU-MIMO. One or more channel estimation field(s) that are mutually orthogonal to each other and/or have the same or similar properties as the channel estimation field(s) used in 802.11ad may be identified (e.g., need to be identified).

MIMO transmission and setup implementations may be provided. In mmW, MIMO transmission (e.g., MIMO transmission that is different from SISO) may involve multiple radio frequency (RF) chains at Tx/Rx side or both. There may be one or more beam patterns to be adopted at Tx and/or Rx side. A Rx beam pattern may match or (e.g., need to) match a beam pattern used at Tx side, for example, to achieve good BF performance. Beams used at the transmitter side may be signaled such that the receiver may select matching receive beams, e.g., before MIMO transmission. One or more beam modes and the usage of the beam modes may be specified herein, e.g., type I beam modes and/or type II beam modes. For example, one or more of the following beam modes (e.g., type I beam modes) may be used.

Type I beam modes may include a basic quasi-omni mode and/or a quasi-omni mode for a single data stream transmission. One or more RF chains may be used. With more than one RF chain, a (e.g., each) RF chain may form the RF chain's own quasi-Omni beam. In an example with two RF chains, the quasi-omni analog weight may be represented as $W_{RF}^{QO} = [w_{RF1}^{QO}, w_{RF2}^{QO}]$, where each $w_{RFk}^{Omni}$, k=1, 2, may be a vector of size N×1, and N is the size of antenna elements controlled by the RF chain.

With basic quasi-omni mode and/or quasi-omni mode for a single data stream transmission, baseband processing may include one or more of a baseband/digital domain precoding, a baseband/digital domain space-time coding, a baseband/digital domain cyclic shift diversity (CSD), a baseband/digital domain antenna/polarization selection, and/or the like. A baseband/digital domain precoding may be used. In one or more of the examples herein, the baseband weight may be $W_{BB}$. The $W_{BB}$ may be with size 2×1, e.g., in the case that a single data stream may be transmitted. A transmit signal may be represented as, e.g., $W_{RF}^{QO}W_{BB}$s. The baseband precoding vector may be represented as, e.g., $W_{BB}$, and/or may be implementation based, for example, once the precoding scheme is set. The baseband precoding vector (e.g., $W_{BB}$) may be applied to the CEF field, e.g., the same way as baseband precoding vector may be applied to data portion. The baseband precoding vector may be transparent to the receiver. A baseband/digital domain space-time coding may be used. In one or more of the examples herein, two baseband symbols may be used and/or may be allocated in different time and/or frequency.

Type I beam modes may include a directional mode for SU-MIMO with a single data stream transmission, a directional mode for SU-MIMO with a multi-data stream transmission, a directional mode for MU-MIMO with a single data stream transmission for a (e.g., each) user and/or a directional mode for MU-MIMO with a multi-data stream transmission for a (e.g., each) user.

An analog beam mode(s) may be set up and/or specified, e.g., when hybrid beamforming may be utilized in the system. The digital precoding/beams may be changed on the fly. For example, one or more of the following beam modes, which may be referred to as type II beam modes, may be used. Type II beam modes may include K quasi-omni beams, where K<=Kmax is the number of RF chains and/or the number of analog beams used for a transmission. Kmax may be the maximum number of RF chains available and/or the maximum number of analog beams formed by a device. The value of K may be specified and/or signaled in the system. Type II beam modes may include K directional beams for SU-MIMO, where K<=Kmax is the number of RF chains and/or the number of analog beams used for the transmission. Kmax is the maximum number of RF chains available and/or the maximum number of analog beams formed by the device. The value of K may be specified and/or signaled in the system. The indices of analog beams (e.g., selected analog beams) may be signaled, e.g., in the case K<Kmax. Type II beam modes may include K directional beams for DL MU-MIMO, where $K = \sum_{u=1}^{Nu} K_u \leq K_{max}$ is the total number of RF chains and/or the number of analog beams used for the transmission to the Nu users. Kmax may be the maximum number of RF chains available and/or the maximum number of analog beams formed by the transmitter device. The value of K, and/or Ku, u=1, ..., Nu, may be specified and/or signaled in the system. The indices of selected analog beams and/or the analog beams assigned for a (e.g., each) user may be signaled. Digital/baseband domain spatial schemes may be applied, e.g., if the number of data streams to be transmitted may be less than K described herein. The analog beams to be used may be fixed to the K specified beams.

Transmissions of DMG and/or EDMG frames may be switched between or among beam modes (e.g., the beam modes described herein). It may be possible to switch beam modes from legacy preamble portion (e.g., including Legacy Short Training Field (L-STF), Legacy-channel estimation (L-CE), L-Header, EDMG-Header-A fields) to EDMG portion (e.g., including EDMG-STF, EDMG-CE, EDMG-Header-B and data fields), for example, with an EDMG PPDU transmission. Beam modes for the training (TRN) field may be signaled in a PHY header, for example, in the case a BRP TRN field may be appended at the end of the PPDU.

Some beam mode(s) may be specified as a default beam mode(s). The default beam mode(s) may be used for certain transmission(s) which may not require an (e.g., any) explicit beam set-up. Receivers may expect transmission(s) with default mode(s), for example, if there is little or no signaling to explicitly signal usage of a beam mode(s). The usage of transmitting certain frames with certain beam mode(s) may be specified. For example, a default beam mode selection may follow one or more of the following rules.

The default beam mode selection may follow the rule that the beam mode may be basic quasi-omni mode or quasi-omni mode for a single data stream transmission with a fixed baseband scheme if a type I beam mode(s) is adopted, e.g., for broadcast or multicast management and/or control frames (e.g., Beacon frames, announcement frames etc.). For example, basic quasi-omni mode or quasi-omni mode for a single data stream transmission with baseband precoding (e.g., quasi-omni analog beams with baseband precoding) may be specified as a default beam mode for broadcast and/or multicast management and/or control frames. Basic quasi-omni mode or quasi-omni mode for a single data stream transmission with baseband/digital domain space-time coding (e.g., quasi-omni analog beams with baseband space time block code (STBC) like beam mode) may be specified. Any basic quasi-omni mode or quasi-omni mode for single data stream transmission may be used. If a type II beam mode(s) is adopted, K quasi-omni beams, where K<=Kmax is the number of RF chains or number of analog beams used for the transmission (e.g., with K=Kmax or K=1) may be used for broadcasting and/or multicasting management/control frames. A beam mode(s) may be specified in a standard and/or the beam mode(s) may be set up in a beacon frame. The default beam mode may be fixed and/or used in a beacon interval, for example, when beam modes may be set up in a beacon frame. In a beacon interval (e.g., a different beacon interval from the beacon interval where the default beam mode may be fixed and used), the default beam mode may be announced by the AP/PCP (e.g., again in a beacon frame). The default beam mode used in a previous beacon interval may be utilized, for example, if no different (e.g., new) default beam mode is announced.

The default beam mode selection may follow the rule that, for unicast management/control frames, the default beam mode may be the same as broadcast/multicast management/control frame (e.g., quasi-omni based beams). The default beam mode may be a directional beam(s). For example, when a type I beam mode(s) is adopted, a directional mode for SU-MIMO with a single data stream transmission(s) may be utilized. When a type II beam mode(s) is adopted, K directional beams for SU-MIMO, where K<=Kmax is the number of RF chains or the number of analog beams used for the transmission (e.g., with K=Kmax or K=1), may be used.

The default beam mode selection may follow the rule that, for data frames without explicit beam setup, the default beam mode may be a directional beam(s). For example, when a type I beam mode(s) is adopted, a directional mode for SU-MIMO with a single data stream transmission(s) may be utilized. When type II beam mode(s) is adopted, K directional beams for SU-MIMO, where K<=Kmax is the number of RF chains or number of analog beams used for the transmission (e.g., with K=Kmax or K=1), may be used.

The default beam mode selection may follow the rule that, for data frames with an explicit beam setup, the beam mode may follow a beam setup field. The beam setup field may be carried in one or more of a MIMO setup frame, a multi-channel setup frame, a beacon frame, an allocation field, a schedule element, an extended schedule element, and/or the like.

MU-MIMO implementations may be provided. A network entity (e.g., an access point) may group MU-MIMO users, for example, based on a characterization of a beam(s) and/or a ranking of a beam(s). The characterization of a beam(s) may include a good beam (e.g., best beams) and/or a bad beam (e.g., worst beams). A good beam(s) and a best beam(s) may be used interchangeably. A bad beam(s) and a worst beam(s) may be used interchangeably. The AP may provide beam (e.g., analog beams) and/or antenna (e.g., virtual antenna) allocation. The grouping or separation of stations (e.g., stations associated with users) may be performed in various ways for different transmissions. For example, with a DL MU-MIMO transmission(s), the AP may perform the grouping or separation of stations in a spatial domain. In an example, analog beamforming and/or hybrid beamforming may be applied for grouping or separating the stations. Hybrid beamforming may include analog and digital beamforming techniques. With mmW transmission (e.g., when hybrid beamforming is applied), one or more techniques may be used to group or separate the stations. For example, analog beamforming may be used, analog/digital beamforming may be used, etc.

Analog beamforming may be used to separate and/or group stations (e.g., stations associated with users). Beamforming may focus a transmission from a transmitter (e.g., a virtual antenna) such that the transmission becomes more directional. Analog beamforming may enable a transmitter to transmit from multiple beams and/or RF chains. The AP/PCP may include one or more antennas (e.g., virtual antennas). The stations (e.g., stations associated with users) may include one or more antennas (e.g., virtual antennas). Using analog beamforming and/or hybrid beamforming, an antenna(s) (e.g., a virtual antenna(s)) may transmit via one or more beams (e.g., analog beams) and/or RF chains.

The AP/PCP may use inter-user interference information to perform user selection/pairing/grouping. The inter-user interference information may include interference among transmissions to and/or from different stations (e.g., stations associated with users). Various parameters or metrics may be used to indicate the inter-user interference or the extent of the inter-user interference. For example, signal to noise ratio (SNR) or signal to interference plus noise ratio (SINR) may be used to characterize the inter-user interference or the extent of the inter-user interference. The inter-user interference information may be acquired in various ways. For example, inter-user interference information may be acquired by analog beam training, analog beam tracking, analog beam down selection, and/or the like.

The inter-user interference information may be acquired by analog beam training. During analog beam training (e.g., an extended SLS implementation), a transmitter (e.g., the AP) may send from an antenna (e.g., a virtual antenna) of the transmitter one or more analog transmissions. For example, an analog transmission may include a transmission through an analog beam that is formed with a virtual antenna.

The analog transmission may include various signaling. For example, the analog transmission may be a sounding frame or signal. The virtual antenna of the transmitter may transmit via one or more analog beams (e.g., a transmission per beam). A receiver (e.g., a station) may receive via an antenna (e.g., a virtual antenna) of the receiver the one or more analog transmissions. The virtual antenna of the receiver may receive the one or more analog transmissions via one or more analog beams. For example, a beam of a virtual antenna of the station may receive some or all analog transmissions from the AP. An analog transmission of the one or more analog transmissions may be communicated from a beam of a virtual antenna of the AP to a beam of a virtual antenna of the station. The beam of the virtual antenna of the AP and the beam of the virtual antenna of the station may form a TX and RX beam pair. For example, the beam of the virtual antenna of the AP may be the TX beam in the beam pair. The beam of the virtual antenna of the station may be the RX beam in the beam pair. Different TX and RX beam pairs may be associated with different inter-user interference information. Inter-user interference information may be measured, for example by the station, and may be based on the analog transmission(s) communicated between the TX and RX beams or beam pair. The virtual antenna of the AP and the virtual antenna of the station may form a TX and RX virtual antenna pair. For example, the virtual antenna of the AP may be the TX virtual antenna of the virtual antenna pair. The virtual antenna of the station may be the RX virtual antenna of the virtual antenna pair.

The inter-user interference information may be acquired by analog beam tracking. For example, analog beam tracking may be performed as an one-to-multiple sector level sweeping between an AP and STAs and/or a one-to-one sector level sweeping between an AP and an STA. Analog beam tracking may be performed as one-to-multiple sector level sweeping between an STA and STA(s) and/or one-to-one sector level sweeping between an STA and another STA. Analog beam tracking may be part of an MIMO BF training implementation. For example, analog beam tracking may be an SISO phase of an enhanced BF training. During analog beam tracking (e.g., an extended BRP implementation), the AP/PCP may transmit a training sequence one or more times using one or more beams or beam combinations. The training sequence may include one or more analog transmissions through one or more analog beams or beam combinations. The AP/PCP may be configured to track the one or more beams or beam combinations. The AP/PCP may determine and/or identify the one or more beams or beam combinations to track.

The inter-user interference information may be acquired by analog beam down selection. During analog beam down selection (e.g., an extended SLS implementation and/or an extended BRP implementation and/or SLS implementation using a BRP frame(s)), the AP/PCP may transmit a training sequence or a training frame(s) using one or more beams or beam combinations. The training sequence or training frame(s) may include one or more analog transmissions. An STA(s) may report feedback (e.g., channel measurements such as SNR or CSI) back to an AP/PCP. The AP/PCP may be configured to downselect the one or more beams or beam combinations based on the feedback. The AP/PCP may determine and/or identify the one or more beams or beam combinations to downselect and/or perform an SU/MU-MIMO BF training (e.g., a further SU/MU-MIMO BF training).

The acquired inter-user interference information may be used, for example by the station, to determine a characterization of a beam and/or beam pair. Some beams and/or beam pairs may be characterized as good (e.g., best) beams and/or beam pairs. Some beams and/or beam pairs may be characterized as bad (e.g., worst) beams and/or beam pairs. The inter-user interference information may be used to compare with one or more thresholds (e.g., a relatively higher threshold and/or a relatively lower threshold) to determine the best and/or worst beam/beam pairs. The inter-user interference information may be used to compare with different inter-user interference information measured based on a transmissions(s) via a different beam(s)/beam pair(s) and/or via a different antenna(s)/antenna pair(s) to determine the best and/or worst beam/beam pairs. The beams and/or beam pairs and/or the antenna(s)/antenna pair(s) may be ranked based on the inter-user interference information.

In an example, an SNR threshold may be used for characterizing the beams and/or beam pairs. The beams and/or beam pairs associated with an SNR that is greater or equal to the SNR threshold may be characterized as best beams and/or beam pairs. The beams and/or beam pairs associated with an SNR that is less than the SNR threshold may be characterized as worst beams and/or beam pairs. As described herein, a Tx and Rx virtual antenna pair may include one or more beams and/or beam pairs.

A beamformee (e.g., the station) may feed back information including or indicating the best few beams and/or beam pairs for a (e.g., each) Tx and Rx virtual antenna pair. A beamformee (e.g., the station) may feed back information including or indicating the worst few beams for the (e.g., each) Tx and Rx virtual antenna pair. For example, the station may feed back the best and/or the worst few beams to the AP/PCP via an indication(s). The indication(s) may include a frame(s) or be sent via a frame(s). A beamformee (e.g., the station) may feed back information including or indicating channel measurements such as an SNR(s) associated with a (e.g., each) triple <beam ID, Tx antenna ID, Rx antenna ID> and/or CSI associated with the triple <beam ID, Tx antenna ID, Rx antenna ID>. For a pair (e.g., a fixed pair or a selected pair) of Tx antenna ID and Rx antenna ID, one or more beam IDs associated with best and/or worst beams may be selected and/or reported. The one or more beam IDs may be associated with one or more best and/or worst beams/beam pairs.

The AP/PCP may receive the indication(s) and/or use the indication(s) to group and/or separate users and/or stations. The implementations described herein may be applicable to one or more stations. For example, the AP/PCP may receive, from one station, an indication of the best beam of the AP/PCP for the station. The best beam of the AP/PCP for the station may be identified/selected from multiple beam/beam pairs for a Tx and Rx virtual antenna pair. The AP/PCP may receive, from another station, an indication of the worst beam of the AP for that other station for another Tx and Rx virtual antenna pair. The AP/PCP may determine based on one or more of the indications for multiple stations that the best beam for one station may be among the worst beams for another station. The AP/PCP may determine based on one or more of the indications for multiple stations that a virtual antenna of the AP/PCP may include the best beam for one station, and that that another virtual antenna of the AP/PCP may include the best beam for another station. The AP/PCP may determine to group the two stations for transmissions (e.g., DL MU-MIMO transmissions). The AP/PCP may indicate to both stations about the grouping.

In the example, the AP/PCP may indicate to the stations about the allocation of the respective beam/RF chain/virtual antenna allocation to the respective station. The AP/PCP may perform the allocation to the stations for a DL MU-MIMO transmission(s). For example, the allocation may be performed using one or more of the triples <beam ID, Tx antenna ID, Rx antenna ID> with (e.g., plus) a user ID(s) and/or a spatial stream ID(s), for example, if an allocation of the spatial stream to the user may be explicit. For example, the AP/PCP may have four beams/RF chains/virtual antennas (e.g., virtual antennas 1-4). The AP/PCP may transmit to user 1 (e.g., station 1 associated with user 1) and user 2 (e.g., station 2 associated with user 2) through DL MU-MIMO. As an example, the AP/PCP may allocate beam/RF chain/virtual antennas 1 and 2 to user 1 based on one or more indications. The AP/PCP may allocate beam/RF chain/virtual antennas 3 and 4 to user 2 based on one or more indications.

Stations (e.g., stations associated with users) may be separated by analog/digital beamforming. With the analog/digital beamforming technique, the stations (e.g., stations associated with users) may not be totally separated by the analog beams. As an example, the AP/PCP may not require inter-user interference feedback. The AP/PCP may group stations (e.g., stations associated with users) and/or perform an inter-user interference cancellation in baseband/digital domain. The AP/PCP may stop the MU-MIMO, e.g., when MU-MIMO transmission failure may be observed. The AP/PCP may use (e.g., require) partial inter-user interference feedback. The AP/PCP may group stations (e.g., stations associated with users) based on the partial inter-user interference feedback and/or perform an inter-user interference cancellation in baseband/digital domain.

The allocation of the respective beam/RF chain/virtual antenna to the respective station may be set up, for example by the AP, and/or signaled in an MIMO setup frame and/or other frames (e.g., if stations are separated by analog beamforming or by analog/digital beamforming). For example, the allocation of the respective beam/RF chain/virtual antenna to the respective station may be signaled in an MIMO setup frame beam to align the beams/RF chains/virtual antennas at TX and RX sides.

Figure 9:
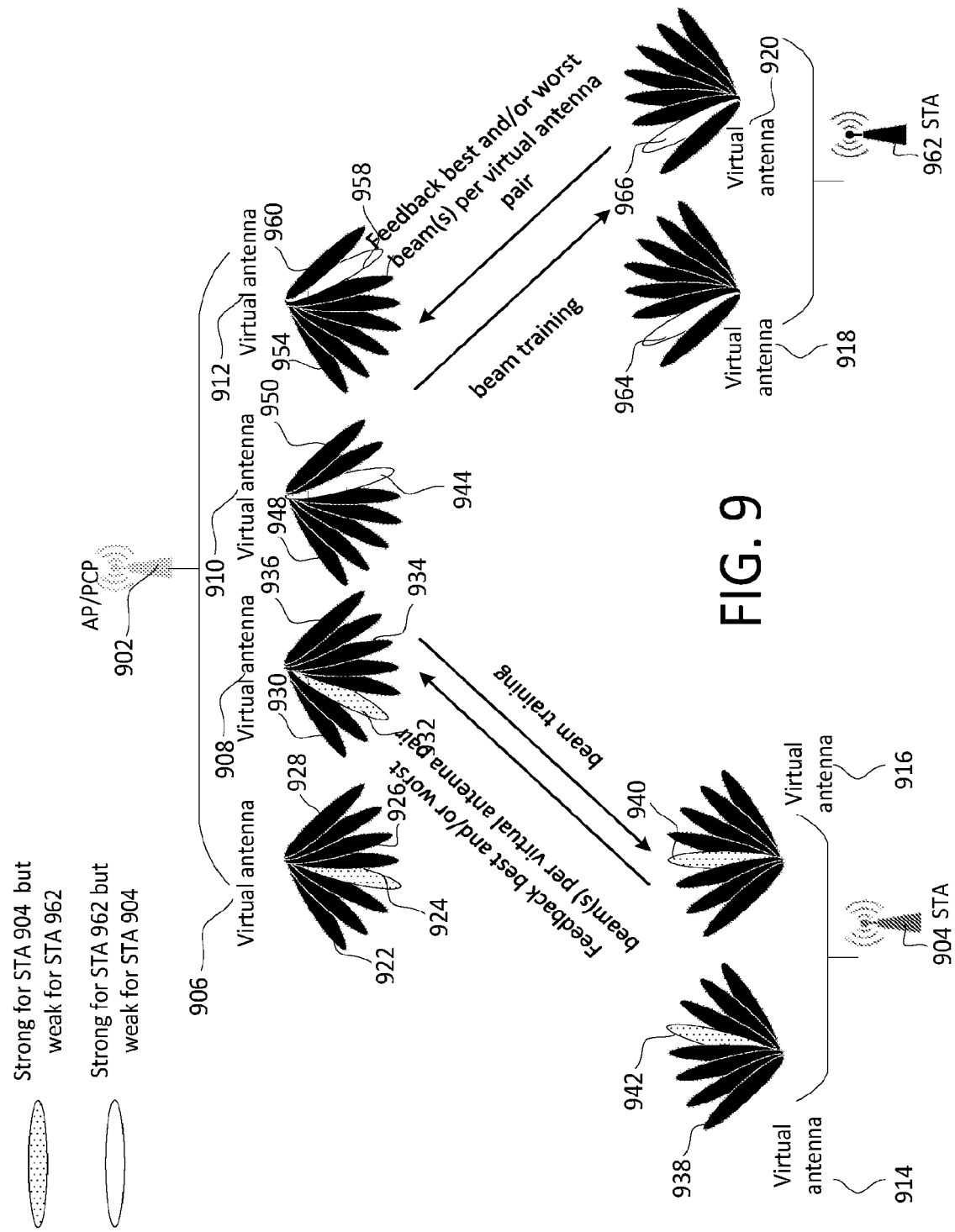
FIG. 9 illustrates an example diagram of MU-MIMO analog beam training selection.

Detailed MU-MIMO user grouping and/or beam/antenna allocation may be described herein. FIG. 9 may refer to specific beams, virtual antennas, and stations, but the specific beams, virtual antennas, and stations are for illustrative purposes. The beams, virtual antennas, and stations may be paired in various ways (e.g., depending on implementations). Any network entity, station, antenna, virtual antenna may perform the implementation or feature (e.g., determining the best beam or worst beam) herein.

FIG. 9 shows an example of a MU-MIMO user selection and/or beam/antenna allocation using analog beam training, tracking, down selection and/or refinement. The technique as shown in FIG. 9 may be implemented using sector level sweep and/or beam refinement protocol and/or an extended version of SLS and BPR protocol. In the example of FIG. 9, the AP/PCP 902 may include 4 virtual antennas 906-912 (e.g., PAAs, and/or a PAA with multiple polarizations). Virtual antennas 906-912 may each form 8 analog beams. STA 904 and STA 962 may be potential beamformees. STA 904 may have 2 virtual antennas 914 and 916. STA 962 may have 2 virtual antennas 918 and 920. Virtual antennas 914 and 916 may each form 8 analog beams. Virtual antennas 918 and 920 may each form 8 analog beams. The implementation and/or structures described herein may be used in one or more examples herein. The implementation and/or structures herein may be extended to any number of virtual antennas and/or stations (e.g., stations associated with users).

The AP/PCP 902 may perform analog beam training, tracking, down selection and/or or refinement (e.g., by sweeping AP/PCP's transmit analog beams) with one or more STAs. The AP/PCP 902 may sweep beams with a (e.g., one) virtual antenna at a time with a random or a preselected order. For example, the AP/PCP 902 may sweep beams with virtual antenna 906 and sweep virtual antenna 908 after the AP/PCP 902 completes sweeping beams with virtual antenna 906. The AP/PCP 902 may sweep beams with virtual antenna 910 and/or virtual antenna 912 (e.g., in a similar way or a different way). The order in which the AP/PCP 902 works through the virtual antennas (e.g., virtual antennas 906-912) may vary. For example, the AP/PCP 902 may sweep 8 beams including beams 922-928. The AP/PCP 902 may transmit multiple analog transmissions via the 8 beams associated with the virtual antenna 906. The AP/PCP 902 may transmit an analog transmission per beam. For example, the AP/PCP 902 may transmit an analog transmission via beam 922. The analog transmissions may include a sounding signal or a sounding frame. The STA 904 may receive the transmission from beam 922 at the virtual antenna 914 and/or virtual antenna 916 of the STA 904. For example, the virtual antenna 914 may include 8 beams including beams 938-942. The STA 904 may receive the analog transmission from beam 922 at one, some, or all 8 beams of the virtual antenna 914. The STA 904 may measure inter-user interference information of an analog transmission(s) for a TX and RX beam pair.

The STA 904 may characterize a TX and RX beam pair based on inter-user interference information measured on an analog transmission that the STA 904 receives via the TX and RX beam pair. The STA 904 may characterize the analog transmission based on the measured inter-user interference information and/or characterize the TX and RX beam pair based on the characterization of the analog transmission. For example, the inter-user interference information may include SNR and/or SINR. In the example shown in FIG. 9, the STA 904 may measure the SNR of the transmission that the STA 904 received via the TX beam 922 and RX beam 938 pair. The STA 904 may characterize the transmission that the STA 904 received via the TX beam 922 and RX beam 938 pair. The STA 904 may rank the transmission that the STA 904 received via the TX beam 922 and RX beam 938 pair among the transmission(s) that the STA 904 received via other TX beam and RX beam pairs. The STA 904 may rank the transmission that the STA 904 received via the TX beam 922 and RX beam 938 pair among the transmission(s) that the STA 904 received via the beam pair of TX beam 922 and other RX beams (e.g., the TX 922 and RX 942 beam pair) at virtual antenna 914. The STA 904 may rank the analog transmission that the STA 904 received via the TX beam 922 and RX beam 938 pair among analog transmissions that the STA 904 received from other beams of virtual antenna 906 including beams 922-928 (e.g., the TX 928 and RX 938 beam pair). The STA 904 may rank analog transmissions associated with relatively higher SNR or SINR higher than other analog transmissions associated with relatively lower SNR or SINR.

A STA may characterize a transmission (e.g., an analog transmission) that the STA receives via a TX and RX beam pair, for example as a best analog transmission or a worst analog transmission, based on one or more thresholds of inter-user interference information and/or based on a comparison of inter-user interference information (e.g., between beams or beam pairs). The STA 904 may receive one or more SNR thresholds or determine one or more preconfigured SNR thresholds to use. In the example shown in FIG. 9, the STA 904 may measure the SNR of the analog transmission that the STA 904 received via the TX beam 922 and RX beam 938 pair. The STA 904 may compare the measured analog transmission with a relatively higher SNR threshold that the STA 904 received. If the measured analog transmission is greater than the relatively higher SNR threshold, the STA 904 may determine that the measured analog transmission is a best analog transmission. The STA 904 may receive a relatively lower SNR threshold. The STA 904 may compare the measured analog transmission with the relatively lower SNR threshold. If the measured analog transmission is less than the relatively lower SNR threshold, the STA 904 may determine that the measured analog transmission is a worst analog transmission.

The STA may characterize a TX beam, a RX beam, or a TX and RX beam pair as a best beam/beam pair or a worst beam/beam pair based on the characterization of the analog transmission that the STA received via the TX beam, the RX beam, or the TX and RX beam pair. In the example shown in FIG. 9, the STA 904 may receive the analog transmission from beam 922 to the beams at virtual antenna 914. The STA 904 may measure the SNR(s) of the analog transmission at one, some, or all 8 beams including beams 938-942. For example, the STA 904 may measure the SNR of the analog transmission between the TX 922 and RX 938 beam pair (922/938 analog transmission) and/or compare the measured SNR with the relatively lower SNR threshold. The STA 904 may determine that the measured SNR is less than the relatively lower SNR threshold and/or determine that the 922/938 analog transmission is the worst analog transmission. The STA 904 may measure the SNR of the analog transmission between the TX 924 and RX 942 beam pair (924/942 analog transmission) and/or compare the measured SNR with the relatively higher SNR threshold. The STA 904 may determine that the measured SNR is greater than the relatively higher SNR threshold and/or determine that the 924/942 analog transmission is the best analog transmission. The STA 904 may determine that the TX 924 and RX 942 beam pair is the best beam pair based on the determination that the 924/942 analog transmission is the best analog transmission. The STA 904 may determine that the TX 924 beam and/or the RX 942 beam is the best beam based on the determination that the 924/942 analog transmission is the best analog transmission. The STA 904 may determine that the 922/938 analog transmission is the worst beam pair based on the determination that the 922/938 analog transmission is the worst analog transmission. The STA 904 may determine that the TX 922 beam and/or the RX 938 beam is the worst beam(s) based on the determination that the 922/938 analog transmission is the worst analog transmission.

The STA may associate the determination of the best beam/beam pair and/or the worst beam/beam pairs with a virtual antenna pair. In the example shown in FIG. 9, the Tx beam 924 is from virtual Tx antenna 906, and the Rx beam 942 is from virtual Rx antenna 914. The STA 904 may determine that, for the virtual antenna pair 906 and 914, the best beam pair is the TX 924 and RX 942 beam pair based on the determination of the best beam pair as discussed herein. In a similar or same way, the STA 904 may determine that, for the virtual antenna pair 908 and 916, the best beam pair is the TX 932 and RX 940 beam pair.

The STA 904 may be aware of or be able to identify, for the best and/or worst beam(s)/beam pair(s), the AP/PCP, the virtual antenna(s) of the AP/PCP, the beams of the virtual antennas of the AP/PCP, the station, the virtual antenna(s) of the station, the beams of the virtual antennas of the station, each of which is associated with the best and/or worst beam(s)/beam pair(s). The AP/PCP, the virtual antenna(s) of the AP/PCP, the beam(s) of the virtual antenna(s) of the AP/PCP, the station(s), the virtual antenna(s) of the station(s), and/or the beams of the virtual antenna(s) of the station may be associated with an index and/or identification. The index and/or identification may be communicated between the AP/PCP and the station(s), for example, via a frame(s). For example, the AP/PCP 902 may send a sounding frame from the beam 924 of the virtual antenna 906. The sounding frame may include an identification of the beam 924 (e.g., a beam ID) and/or an identification of the virtual antenna 906 (e.g., a virtual antenna ID). A frame may include an identification by which the AP/PCP may associate with the AP/PCP's TX virtual antenna ID and TX beam ID. The identification by which the AP/PCP may associate with AP/PCP's TX virtual antenna ID and TX beam ID may be unique. The station 904 may receive a frame (e.g., the sounding frame) via the beam 942 at the virtual antenna 914. The station 904 may determine that the best analog transmission is associated with the TX 924 and RX 942 beam pair. The station 904 may determine that the best analog transmission is associated with the TX 906 and RX 914 antenna pair. The station 904 may feed back the determination(s) to the AP/PCP 902. The feedback information may include or indicate channel measurements such as an SNR(s) measurement or CSI for an (e.g., each) combination and/or set <Tx antenna ID, Rx antenna ID, Rx beam ID, Rx beam ID>. A Rx antenna ID(s) and/or Rx beam ID(s) may not be explicit. A receiver (e.g., the station 904) may determine and/or associate the Rx antenna ID(s) and/or Rx beam ID(s) with a corresponding Tx antenna ID(s) and/or Tx beam ID(s).

A station (e.g., STA 904) may use the implementations described herein to determine best and/or worst beam/beam pairs for other virtual antenna pairs. In the example shown in FIG. 9, the STA 904 may determine that the best TX beam for the TX 908 and RX 914 antenna pair is the beam 930, and the worst TX beam for the TX 908 and RX 914 antenna pair is the beam 936. The STA 904 may determine that the best TX beam for the TX 910 and RX 914 antenna pair is the beam 948, and the worst TX beam for the TX 910 and RX 914 antenna pair is the beam 944. The STA 904 may determine that the best TX beam for the TX 912 and RX 914 antenna pair is the beam 954, and the worst TX beam for the TX 912 and RX 914 antenna pair is the beam 958. The STA 904 may determine that the best TX beam for the TX 906 and RX 916 antenna pair is the beam 926, and the worst TX beam for the TX 906 and RX 916 antenna pair is the beam 928. The STA 904 may determine that the best TX beam for the TX 908 and RX 916 antenna pair is the beam 932, and the worst TX beam for the TX 908 and RX 916 antenna pair is the beam 934. The STA 904 may determine that the best TX beam for the TX 910 and RX 916 antenna pair is the beam 950, and the worst TX beam for the TX 910 and RX 916 antenna pair is the beam 944. The STA 904 may determine that the best TX beam for the TX 912 and RX 916 antenna pair is the beam 960, and the worst TX beam for the TX 912 and RX 916 antenna pair is the beam 958. The STA 904 may record and/or store one or more of the determinations (e.g., in a volatile or non-volatile memory)

One or more stations may use the implementations described herein to determine best and/or worst beam/beam pairs for a virtual antenna(s). In the example shown in FIG. 9, the STA 962 may determine that beam 924 and beam 932 are not the best TX beams (e.g., among the worst beams) for virtual antenna 918 or virtual antenna 920. The STA 962 may determine that beam 944 and beam 958 are among the best beams (e.g., are the best TX beams) for the STA 962. For example, the STA 962 may determine that the beam 944 is the best TX beam for virtual antenna 918 corresponding to the RX beam 964, and that the beam 958 is the best TX beam for virtual antenna 920 corresponding to the RX beam 966.

In one or more examples, the AP/PCP may determine best and/or worst beam/beam pairs for a virtual antenna(s) based on the inter-user interference information that the AP/PCP receives from one or more stations. For example, in FIG. 9, the AP/PCP 902 may receive inter-user interference information for one or more beam/beam pairs for virtual antenna pair 906 and 914. The AP/PCP 902 may receive inter-user interference information via a frame. The AP/PCP 902 may receive one or more thresholds of the inter-user interference information. The AP/PCP 902 may determine one or more thresholds of the inter-user interference information based on a preconfigured specification or indication. The AP/PCP 902 may compare the received inter-user interference information with the threshold and/or determine the best and/or worst beam/beam pairs. The AP/PCP 902 may compare the received inter-user interference information with each other and/or determine the best and/or worst beam/beam pairs.

The AP/PCP may train multiple beams simultaneously, e.g., by using multiple virtual antennas concurrently. The AP/PCP may not sweep all the possible analog beams, e.g., may sweep a subset of the possible analog beams (e.g., determined analog beams).

The STA 904 may feed back that with VA2 at the STA1, the best beam from AP VA1 is beam x; the best beam from AP VA2 is beam 3; the best beam from AP VA3 is beam x; the best beam from AP VA4 is beam x; and corresponding SNRs/SINRs. The information may comprise that with VA2 at the STA1, the worst beam from AP VA1 is beam x; the worst beam from AP VA2 is beam x; the worst beam from AP VA3 is beam 6; the worst beam from AP VA4 is beam 7, and corresponding SNRs/SINRs. For the worst beams, the measurements (SNR/SINR) may be dominated by noise and/or interference. The measurements may or may not be reliable. In that case, a set of beam indices which may have SNR or SINR measured below certain threshold may be fed back. The best beam and/or worst beam may be utilized in one ore more examples herein.

The STA 904 (STA1) may feed back one or more indications (e.g., via a frame) to the AP/PCP 902 indicating the characterization of the beam/beam pairs. For example, the STA 904 may feed back an indication to the AP/PCP 902 indicating the best beam beam(s)/beam pair(s) for a virtual antenna pair. The STA 904 may feed back an indication that comprises the following information, e.g., on reception of the analog beam training frames. The information may comprise that, for virtual antenna 914 (VA1) at the STA1, the best beam from virtual antenna 906 (AP VA1) is the TX beam 924 (beam 4). The information may comprise that, for virtual antenna 914 (VA1) at the STA1, the best beam from virtual antenna 908 (AP VA2) is the TX beam 930. The information may comprise that, for virtual antenna 914 (VA1) at the STA1, the best beam from virtual antenna 910 (AP VA3) is the TX beam 948. The information may comprise that, for virtual antenna 914 (VA1) at the STA1, the best beam from virtual antenna 912 (AP VA4) is the TX beam 954.

The STA 904 may feed back an indication to the AP/PCP 902 indicating the worst beam beam(s)/beam pair(s) for a virtual antenna pair. The information may comprise that, for virtual antenna 914 (VA1) at the STA1, the worst beam from virtual antenna 906 (AP VA1) is the TX beam 922. The information may comprise that, for virtual antenna 914 (VA1) at the STA1, the worst beam from virtual antenna 908 (AP VA2) is the TX beam 936. The information may comprise that, for virtual antenna 914 (VA1) at the STA1, the worst beam from virtual antenna 910 (AP VA3) is the TX beam 944 (beam 6). The information may comprise that, for virtual antenna 914 (VA1) at the STA1, the worst beam from virtual antenna 912 (AP VA4) is the TX beam 958 (beam 7).

The information may comprise corresponding SNRs/SINRs for the best and/or worst beam/beam pairs for a virtual antenna pair. The information may comprise a set(s) of beam indices and/or corresponding SNR or SINR measured. For example, the set(s) of beam indices may include a triple <Tx antenna ID, Rx antenna ID, (Tx) beam ID>) and/or an identity which may be linked (e.g., uniquely linked) to the triple). Measurement of the inter-user interference information may be affected by noise and/or interference. For example, for the worst beams, measurements (e.g., SNR/SINR) may be dominated by noise and/or interference. The measurement may not be reliable in such a case. The information may (e.g., in such a case) comprise a set of beam indices identifying a set of beam and/or beam pairs. For example, the set of beam indices may include a triple(s) <Tx antenna ID, Rx antenna ID, and Tx beam ID>. The set of beam indices may include an identity which may be linked (e.g., uniquely linked) to the triple. For example, the set of beam indices may include Tx antenna ID, Rx antenna ID, and Tx beam ID or an identity which may be uniquely link to the triple that have SNR or SINR measured below a certain threshold (e.g., a relatively lower threshold).

The STA 904 (STA1) may feed back an indication (e.g., via a frame) to the AP/PCP 902 with one or more of indications of the characterization of the beam/beam pairs for additional virtual antennas/antenna pairs. For example, the STA 904 may indicate the following information, e.g., on reception of the analog beam training frames. The information may comprise that, for virtual antenna 916 (VA2) at the STA1, the best beam from virtual antenna 906 (AP VA1) is the TX beam 926. The information may comprise that, for virtual antenna 916 (VA2) at the STA1, the best beam from virtual antenna 908 (AP VA2) is the TX beam 932. The information may comprise that, for virtual antenna 916 (VA2) at the STA1, the best beam from virtual antenna 910 (AP VA3) is the TX beam 950. The information may comprise that, for virtual antenna 916 (VA2) at the STA1, the best beam from virtual antenna 912 (AP VA4) is the TX beam 960.

The STA 904 may feed back an indication to the AP/PCP 902 indicating the worst beam beam(s)/beam pair(s) for additional virtual antennas/antenna pairs. The information may comprise that, for virtual antenna 916 (VA2) at the STA1, the worst beam from virtual antenna 906 (AP VA1) is the TX beam 928. The information may comprise that, for virtual antenna 916 (VA2) at the STA1, the worst beam from virtual antenna 908 (AP VA2) is the TX beam 934. The information may comprise that, for virtual antenna 916 (VA2) at the STA1, the worst beam from virtual antenna 910 (AP VA 3) is the TX beam 944 (beam 6). The information may comprise that, for virtual antenna 916 (VA2) at the STA1, the worst beam from virtual antenna 912 (AP VA 4) is the TX beam 958 (beam 7).

The STA 904 may feed back information about multiple best beam(s)/beam pair(s) and/or multiple worst beam(s)/beam pair(s) to the AP/PCP. The information may indicate the number of (e.g., K) best beams and/or the number of (e.g., N) worst beams. K and/or N may be set by the AP/PCP in a training frame(s), a training setup frame(s), a beacon frame(s) or other kind of control/management frames transmitted by the AP/PCP. One or more of the training frame(s), the training setup frame(s), the beacon frame(s) or other kind of control/management frames transmitted by the AP/PCP may include one or more SNR threshold(s). The one or more SNR threshold(s) may be preconfigured. K and N may be the same or different from each other. K and/or N may be specified in a standard explicitly or implicitly.

The implementations herein may be for illustrative purposes. Any STA(s) may perform the features herein, and/or may determine the best beam(s)/beam pair(s) and/or worst beam(s)/beam pair(s) in a transceiver and/or a receiver. A STA may determine that one or more beams/beam pairs or none of beams/beam pairs for a virtual antenna pair are the best beams/beam pairs. A STA may determine that some or all beams/beam pairs or none of beams/beam pairs for a virtual antenna pair are the worst beams/beam pairs.

One or more stations may feed back indications to one or more AP/PCPs as described herein. In the example shown in FIG. 9, the STA 962 (STA2) may feed back an indication (e.g., via a frame) to the AP/PCP 902 with one or more of indications of the characterization of the beam/beam pairs for a virtual antenna pair(s). The STA 962 may feed back an indication that comprises the following information, e.g., on reception of the analog beam training frames. The indication that is fed back by STA 2 may be the same as or similar to an indication that is fed back by STA 2 (e.g., in format). The indication that is fed back by STA 2 may be based on STA2's measurement. For example, the indication may indicate that beam 4 from AP VA1 and/or beam 3 from AP VA1 are not the best beams (e.g., among the worst beams) for STA2. The frame may indicate that beam 7 from AP VA3 and/or beam 7 from AP VA4 are among the best beams (e.g., the best beams) for STA2.

The configurations and/or implementations herein are for illustrative purposes only. For example, the best TX beam for station 904 and the worst TX beams for station 962 may or may not over lap. If the best TX beam for station 904 and the worst TX beams for station 962 do not over lap, the AP may group or attempt to group the station 904 and/or the station 962 with a station different from either the station 904 or the station 962.

The AP/PCP 902 may receive one or more of the indications herein from STA 1 and/or STA 2. The AP/PCP 902 may perform user grouping or separation based on one or more of the indications. The AP/PCP 902 may use certain rules and/or processes to group or separate the stations (e.g., stations associated with users). The rules and/or processes used may depend on an implementation. For example, the AP/PCP 902 may group stations (e.g., stations associated with users) to minimize the inter-user interference. The AP/PCP may pair or group the STAs for MU-MIMO transmissions. For example, the AP/PCP 902 may group the stations that have the best beam(s) and/or beam pair(s). The AP/PCP 902 may group the stations that have the worst beam(s) and/or beam pair(s). The AP/PCP 902 may group a station that has the best beam(s) and/or beam pair(s) and a station that has the worst beam(s) and/or beam pair(s).

The AP/PCP 902 may send an indication of the grouping to one or more stations (e.g., the stations concerned in the grouping). The indication of the grouping may include identifications for the stations. The indication of the grouping may include antenna/beam configurations, which may include the triple <Tx antenna ID, Rx antenna ID, Tx beam ID> for a (e.g., each) user/spatial stream. An antenna/beam configuration may include information which may be used to derive the triple <Tx antenna ID, Rx antenna ID, Tx beam ID> for a (e.g., each) user/spatial stream.

The AP/PCP 902 may perform antenna allocation based on one or more of the indications. In the example shown in FIG. 9, as described herein, AP VA1 and AP VA2 may include the best beams (e.g., that may be among the worst beams for STA2) for STA1, and AP VA3 and AP VA4 may include the best beams (e.g., that may be among the worst beams for STA1) for STA2. The AP/PCP 902 may allocate AP VA1 and AP VA2 to STA1. The AP/PCP may allocate AP VA3 and AP VA4 to STA2. STA1 and/or STA2 may be aware of the corresponding VA(s) to use based on the determination of the best beam/beam pairs as described herein.

The AP/PCP 902 may perform beam allocation based on one or more of the indications. In the example shown in FIG. 9, as described herein, AP VA1 and AP VA2 may include the best beams. For example, beam 4 may have been determined as the best beam for the AP VA/VA1 pair. Beam 3 may have been determined as the best beam for the AP VA2/VA2 pair. The AP/PCP 902 may allocate beam 4 of AP VA1 to STA 1 and/or beam 3 of AP VA2 to STA 1. STA1 may be aware of the corresponding beam(s) and/or VAs to use based on the determination of the best beam/beam pairs as described herein.

The AP/PCP 902 may indicate and/or signal the beam/antenna allocation to a station(s). The grouping indication may include the beam/antenna allocation. For example, the AP/PCP 902 may indicate and/or signal the beam/antenna allocation in an MIMO setup frame or other frames (e.g., to align the beams at TX and RX sides). STA1 and/or STA2 may prepare STA1's and/or STA2's corresponding receive antennas/beams. An indication (e.g., the indication of the grouping) may indicate beam/antenna allocation. In the example shown in FIG. 9, the beam allocation signaling in this example may include [STA1: VA1, Beam 4; VA2, Beam 3] and [STA2: VA3, Beam 6; VA4, Beam 7]. The beam allocation signaling in this example may include [STA1: Tx VA1, Tx Beam 4, Rx VA1; Tx VA2, Tx Beam 3, Rx VA2] and/or [STA2: Tx VA3, Tx Beam 6, Rx VA1; Tx VA4, Tx Beam 7, Rx VA2].

A specific beam allocation and/or detailed beam indices may be omitted in some cases. For example, an AP/PCP and stations may agree on certain beams. The beams may be optimum beams for the AP/PCP and/or the stations in one or more aspects. For example, if optimum beams are agreed between the AP/PCP and STA1/STA2, the signaling may be [STA1: VA1; VA2] and [STA2: VA3; VA4]. The signaling may use other formats. For example, a bitmap may be used.

Figure 10A:
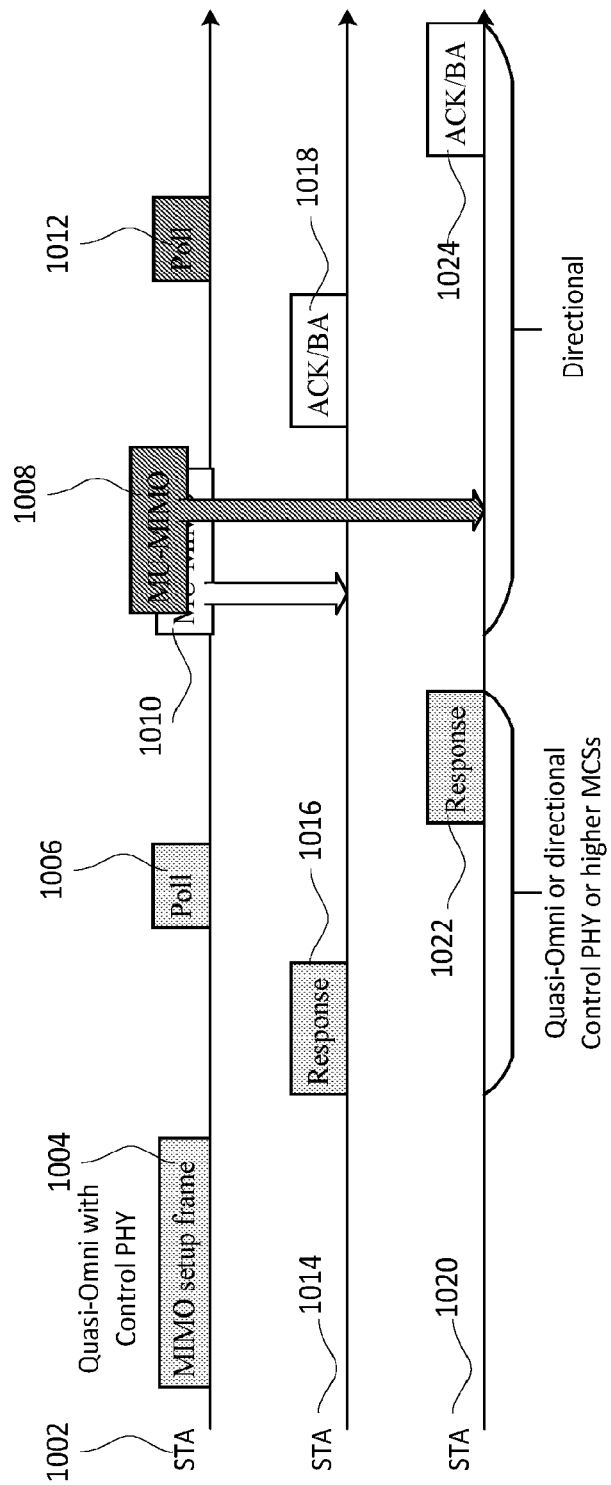
FIG. 10A illustrates an exemplary multi-user (MU)-MIMO setup implementation.

A MU-MIMO setup implementation may be provided. FIG. 10A may show an exemplary MU-MIMO setup implementation.

As shown in example FIG. 10A, STA 1002 (for example, an AP/PCP) may transmit a MU-MIMO setup frame 1004. The MU-MIMO setup frame may be a grant frame depending on implementation. The MU-MIMO setup frame 1004 may be transmitted in a default multicast control frame transmission mode, e.g., basic quasi-omni mode or quasi-omni mode for single data stream transmission in type I or K quasi-omni beams in type II beam modes. STA 1014 may prepare the reception of MIMO setup frame 1004 using a default beam mode. On reception of the response frame 1016 from STA 1014, STA 1002 may poll STA 1020. STA 1002 may successfully receive response frames 1016 and 1022 from STA 1014 and STA 1020. STA 1002 may transmit MU-MIMO PPDUs to STA 1014 and STA 1020 as planned using signaled beam modes. STA 1002 may successfully receive response frames from some of the desired stations (e.g., stations associated with users). STA 1002 may not successfully receive response frames from all desired stations (e.g., stations associated with users). For example, STA 1002 may successfully receive response frame 1016 from STA 1014 and/or may not successfully receive response frame 1022 from STA 1020. One or more schemes may be used if STA 1002 does not successfully receive response frame 1022.

The MU-MIMO setup frame 1004 may be transmitted in a default multicast control frame transmission mode with a single-data-stream transmission(s). As an example, the frame 1004 may be transmitted using a legacy DMG PPDU. A header field may be detected by legacy users. A quasi-omni antenna pattern may be used from the starting of a packet to the end of data portion. The STA 1002 may use a (e.g., a single) RF chain to transmit the frame 1004, e.g., in the case that more than one RF frontends/chains may be available at the STA 1002 side. Some or all of the RF chains may be utilized. Quasi-omni beams may be formed by a (e.g., each) RF chain. In one or more examples, the frame 1004 may be transmitted using a EDMG SU PPDU format. For example, a EDGM-Header-B field may not be present in the preamble. L-STF, Legacy long training field (L-LTF), L-Header and/or EDMG-Header-A fields may be transmitted using a single RF chain. L-STF, L-LTF, L-Header and/or EDMG-Header-A fields may be transmitted using some or all of the RF chains. Detailed transmission techniques/procedures may be disclosed herein. For EDMG-STF, EDMG-CE and data fields, STA 1002 may use a different antenna pattern to transmit the fields. For example, the STA 1002 may use multiple RF chains and/or change digital/baseband domain precoding to support one or more data stream transmission. The STA 1002 may use the same antenna pattern to transmit both legacy portion and EDMG portion. The MAC packet carried by the DMG PPDU may be an EDMG MAC packet, which, for example, may be partially understood by the legacy users.

The MU-MIMO setup frame 1004 may be transmitted in a default multicast control frame transmission mode with some part of the frame transmitted using MU directional transmission mode. For example, STA 1002 may utilize the MU-MIMO transmission beams that may be used for DL MU-MIMO data transmission for the MU-MIMO setup frame. The frame 1004 may be transmitted using legacy DMG PPDU. The MU-MIMO beams may be used from a beginning of the transmission. The frame 1004 may be transmitted using EDMG PPDU. The legacy preamble portion (e.g., including L-STF, L-CEF, L-Header and/or EDMG-Header-A fields) may be transmitted using a quasi-omni beam mode. The EDMG portion (e.g., including EDMG-STF, EDMG-CEF, EDMG-Header-B and/or data fields) may be transmitted using an MU-MIMO beam mode. With this mode, single data stream and/or multi data stream transmissions may be possible.

The MU-MIMO setup frame 1004 may be transmitted in a default multicast control frame transmission mode with STA 1002 indicating the transmission rules for the following UL response frames in the EDMG MIMO setup MAC frame. For example, STA 1002 may indicate antenna/beam mode or analog beam mode that is expected to be used by STA 1014 and/or STA 1020 for response frame transmissions. For example, the triple <Tx antenna ID, Rx antenna ID, Tx beam ID> for a (e.g., each) user/spatial stream or similar (e.g., equivalent) information may be carried. The indication may be omitted when the response frame may use a default beam mode to transmit. The default beam mode may be signaled by the AP/PCP in beacon like management frames. The default beam mode may be specified by the standard. STA 1002 may indicate the number of data streams for a response frame. STA 1002 may indicate baseband/digital spatial schemes used for a response frame, such as STBC, space frequency block code (SFBC), CSD, open loop precoding, closed loop precoding, and/or antenna/polarization selection. STA 1002 may indicate modulation and coding schemes for the response frame. STA 1002 may indicate whether the response frame is poll based. If the response frame is poll based, STA 1002 may indicate whether the response frame (e.g., the first response frame) may be polled by STA1. STAs (e.g., STA 1014 and STA 1020) may be ordered such that the response frames may be transmitted in different time slots using the order.

The MU-MIMO setup frame 1004 may be transmitted in a default multicast control frame transmission mode with STA 1002 indicating the transmission rules for a poll frame (e.g., poll frame 1006) to be transmitted by STA 1002 in the EDMG MIMO setup MAC frame, e.g., if the poll frame is present. For example, STA 1002 may indicate beam mode or analog beam mode that is expected to be used by STA 1002 for the poll frame transmissions. The indication may be omitted when the poll frame may use a default beam mode to transmit. The default beam mode may be signaled by the AP/PCP (e.g., STA 1002) in beacon like management frames. The default beam mode may be specified by the standard. STA 1002 may indicate baseband/digital spatial schemes used for a poll frame (e.g., poll frame 1006), such as STBC, SFBC, CSD, open loop precoding, close loop precoding, and/or antenna/polarization selection. STA 1002 may indicate the number of data streams for poll frame modulation and/or coding schemes for the poll frame.

The MU-MIMO setup frame 1004 may be transmitted in a default multicast control frame transmission mode with STA 1002 indicating the transmission rules for the MU-MIMO transmission to be transmitted by STA 1002 in the EDMG MIMO setup MAC frame. For example, the EDMG MIMO setup MAC frame may include a common field and/or a user specific field. The EDMG MIMO setup MAC frame may carry information (e.g., beam/antenna allocation information). The information may include beam mode or analog beam mode for DL MU-MIMO transmission. STA 1002 may indicate the number of beams/RF chains/virtual antennas available for a (e.g., each) user. STA 1002 may indicate the beam/RF chains/virtual antenna indices assigned for a (e.g., each) user. For example, STA 1002 may have 4 RF chains, and STA 1002 may transmit to 2 users (e.g., STA 1014 and STA 1020). STA 1002 may transmit two spatial streams to STA 1014 and one spatial stream to STA 1020. STA 1002 may transmit MU-MIMO transmission 1010 to STA 1014 and MU-MIMO transmission 1008 to STA 1020. In this example, beam/antenna allocation may be performed and/or signaled explicitly or implicitly. STA 1002 may allocate two beams/RF chains/virtual antennas to STA 1014 and two beams/RF chains to STA 1020. In a user specific field for STA 1014, STA 1002 may indicate that Tx antenna 1, Tx beam x1, and Tx antenna 2, Tx beam y1 may be used pointing to STA 1014. Corresponding or expected Rx antenna ID for a (e.g., each) STA may be indicated explicitly or implicitly. Ina user specific field for STA 1020, STA 1002 may indicate that Tx antenna 3, Tx beam x2, and Tx antenna 4, Tx beam y2 may be used pointing to STA 1014. Corresponding or expected Rx antenna ID for a (e.g., each) STA may be indicated explicitly or implicitly.

Beam/antenna allocation may be performed in unequal ways (e.g., for different stations). Transmit power may be equally distributed among the users (e.g., two stations associated with users) by assigning uniform TX power per user. Transmit power may be unequally distributed among the users (e.g., two stations associated with users) by assigning uniform TX power per beam/antenna. For example, STA 1002 may allocate three beams/RF chains/virtual antennas to STA 1014 and one beams/RF chains to STA 1020. In a user specific field for STA 1014, STA 1002 may indicate that Tx antenna 1, Tx beam x1, and Tx antenna 2, Tx beam y1 and Tx antenna 3, Tx beam z1 may be used pointing to STA 1014. In a user specific field for STA 1020, STA 1002 may indicate that Tx antenna 4, Tx beam x2 may be used pointing to STA 1014. Power allocation or power allocation approach may be signaled, e.g., in the case with unbalanced beam/antenna allocation. In the approach described herein, a (e.g., one) set of beamsNAs may be assigned to a (e.g., each) user. STA 1002 may assign a few sets of beamsNAs to a (e.g., each) user (e.g., STA 1014 and STA 1020). The sets of beams may be in an order. For example, the first choice may be a first set (e.g., in the order). In the case the first set may not succeed, the transmitter and/or receiver(s) may go to a second set etc.

The information may include baseband/digital spatial schemes used for MU-MIMO transmission for a (e.g., each) user frame, such as STBC, SFBC, CSD, open loop precoding, close loop precoding, and antenna/polarization selection. Different spatial schemes may be allowed per user. The information may include the number of data streams per user for MU-MIMO transmission. The information may include modulation and coding schemes per user for MU-MIMO transmission. The information may include channel bonding/aggregation information per user.

The MU-MIMO setup frame may be transmitted in a default multicast control frame transmission mode with STA 1002 indicating the transmission rules for the following uplink (UL) ACK frames 1018 and/or 1024, e.g., in the EDMG MIMO setup MAC frame. STA 1014 and STA 1020 may use the same beams as that used for DL MU-MIMO reception if antenna reciprocity is assumed, e.g., in the case that UL MU-MIMO may be allowed for ACK transmission.

STA 1014 and STA 1020 may use a different set of beams for transmission, e.g., in the case that ACK frames 1018 and/or 1024 may be transmitted one after another different time slot. STA 1002 may indicate beam mode or analog beam mode that is expected to be used by STA 1014 and STA 1020 for ACK frame transmissions. The indication may be omitted when ACK frame 1018 and/or 1024 may use default beam mode to transmit. The default beam mode may be signaled by the AP/PCP in beacon like management frames. The default beam mode may be specified by the standard. The default mode may be a quasi-omni transmission or a directional single data stream transmission where the directional beams may be trained and/or agreed (e.g., previously).

STA 1002 may indicate the number of data streams for an ACK frame (e.g., ACK frame 1018 and/or 1024). The indication of the number of data streams may be omitted when an ACK frame (e.g., ACK frame 1018 and/or 1024) may be transmitted with a default number of data streams. STA 1002 may indicate baseband/digital spatial schemes used for ACK frame (e.g., ACK frame 1018 and/or 1024), such as STBC, SFBC, CSD, open loop precoding, close loop precoding, and/or antenna/polarization selection. STA 1002 may indicate modulation and coding schemes for the ACK frame (e.g., ACK frame 1018 and/or 1024). The indication of the modulation and coding schemes for the ACK frame may be omitted when the ACK frame may be transmitted with a default MCS level. STA 1002 may indicate whether the ACK frame is poll based. If so, STA 1002 may indicate whether an (e.g., the first) ACK frame may be polled by STA 1002. The STAs (e.g., STAs 1014 and 1020) may be ordered such that the ACK frames may be transmitted in different time slot using the order.

In the MU-MIMO setup implementation, STA 1014 may prepare the reception of the MIMO setup frame 1004 using a default beam mode. On reception of the MIMO setup frame 1004, STA 1014 may gain the knowledge (e.g., notice) that STA 1014 may be the first user to transmit the response frame with or without polling. STA 1014 may transmit a response frame 1016 to STA 1002 using a default beam mode and/or a beam mode assigned by STA 1002 in the MIMO setup frame 1004. The response frame 1016 may carry information to indicate that STA 1014 may be ready for the following MU-MIMO mode with beam/antenna allocation indicated by STA 1002.

In the MU-MIMO setup implementation, on reception of the response frame 1016 from STA 1014, STA 1002 may poll STA 1020. STA 1020 may prepare the reception of the MIMO setup frame 1004 and the poll frame 1006 using a default beam mode. On reception of the MIMO setup frame 1004, the STA 1020 may gain knowledge (e.g., notice) that the STA 1020 may be the second user to transmit the response frame 1022 with or without polling. On reception of the poll frame 1012, the STA 1020 may transmit the response frame 1022 to STA 1002 using a default beam mode or a beam mode assigned by STA 1002 in the MIMO setup frame 1004. The response frame 1022 may carry information to indicate STA 1020 may be ready for the following MU-MIMO mode with beam/antenna allocation indicated by STA 1002.

In some cases of the MU-MIMO setup implementation, STA 1002 may successfully receive response frames 1016 and 1022 from STA 1014 and STA 1020, respectively. STA 1002 may transmit MU-MIMO PPDUs to STA 1014 and STA 1020 as planed using signaled beam modes.

Figure 10B:
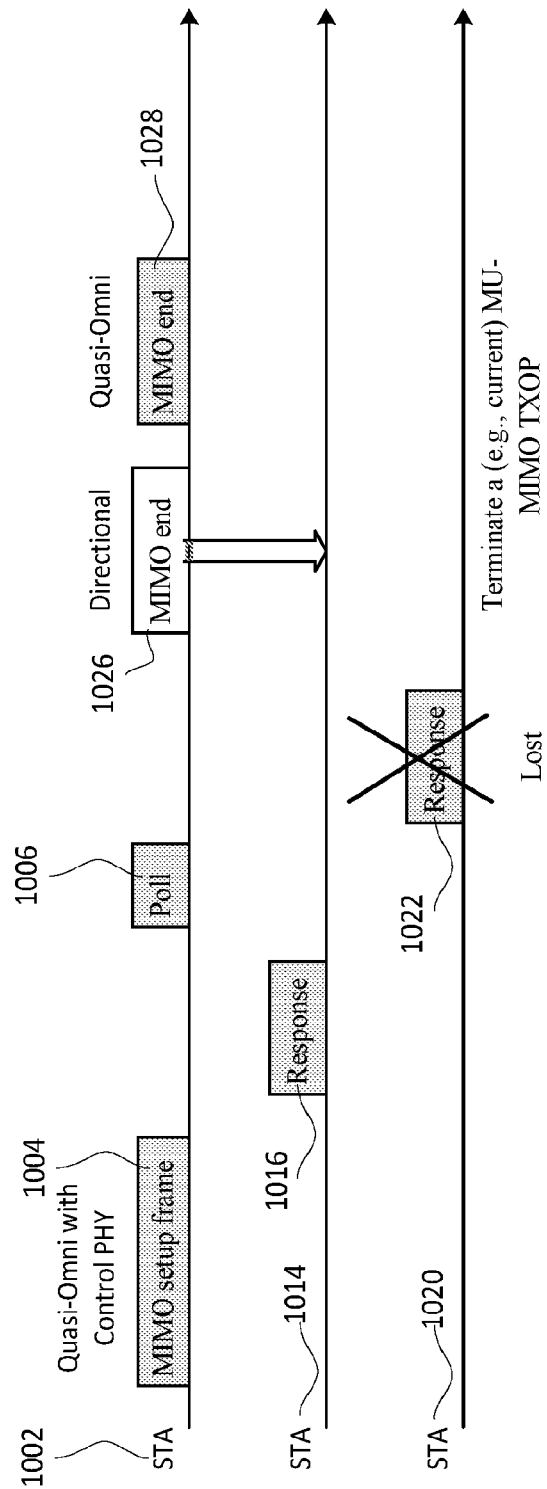
FIG. 10B illustrates an exemplary implementation for partial transmission failure scheme 1.
Figure 10C:
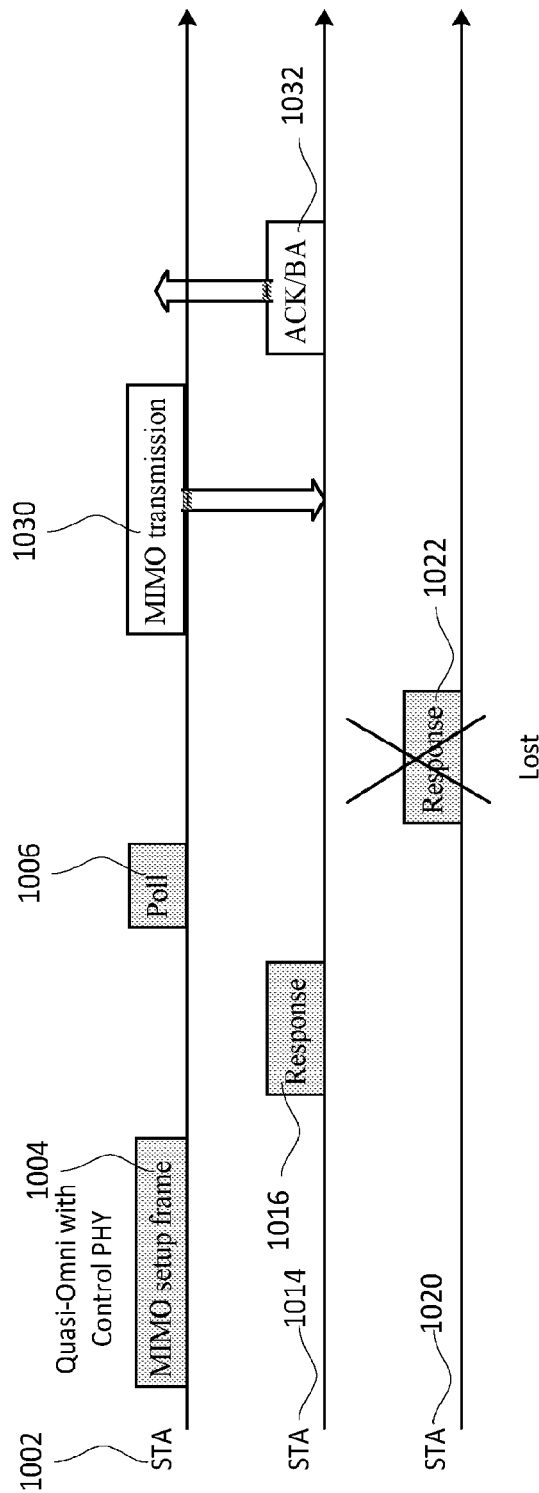
FIG. 10C illustrates an exemplary implementation for partial transmission failure scheme 2.

In some cases of the MU-MIMO setup implementation, STA 1002 may successfully receive response frames from some of stations (e.g., the desired users or stations associated with the users). STA 1002 may not successfully receive response frames from all of the desired users. In this example, STA 1002 may receive (e.g., only receive) response frames from STA 1014. STA 1002 may use one or more of partial transmission failure scheme (e.g., as illustrated in FIG. 10B) or transmission failure scheme (e.g., as illustrated in FIG. 10C). For the partial transmission failure scheme (e.g., as illustrated in FIG. 10B), various approaches may be used. In one of the approaches, STA 1002 may transmit a MIMO end frame 1026 using the beam mode for STA 1014. xIFS period later, STA 1002 may transmit another MIMO end frame 1028 using default mode or quasi-omni mode to terminate the current MU-MIMO transmission opportunity (TXOP) as shown in FIG. 10B. In one of the approaches, STA 1014 may reply an ACK frame for the directional MIMO end frame 1026 transmission. STA 1002 may transmit the MIMO end frame 1028, e.g., xIFS after. In one of the approaches, the quasi-omni MIMO end frame 1028 may be omitted.

In the transmission failure scheme (e.g., as illustrated in FIG. 10C), STA 1002 may continue the transmission (e.g., MU-MIMO transmission 1030). STA 1002 may use (e.g., only use) the beams/antennas pointing to STA 1014. STA 1002 may allocate a power (e.g., full power) to a subset of users (e.g., STA 1014). STA 1014 may respond with an ACK frame 1032, as shown in FIG. 10C.

In some cases of the MU-MIMO setup implementation, STA 1002 may not receive a (e.g., any) response frame from potential MU-MIMO users or stations associated with users (e.g., all of the users or stations). STA 1002 may terminate the MU-MIMO TXOP by transmitting a MIMO end frame.

Figure 11:
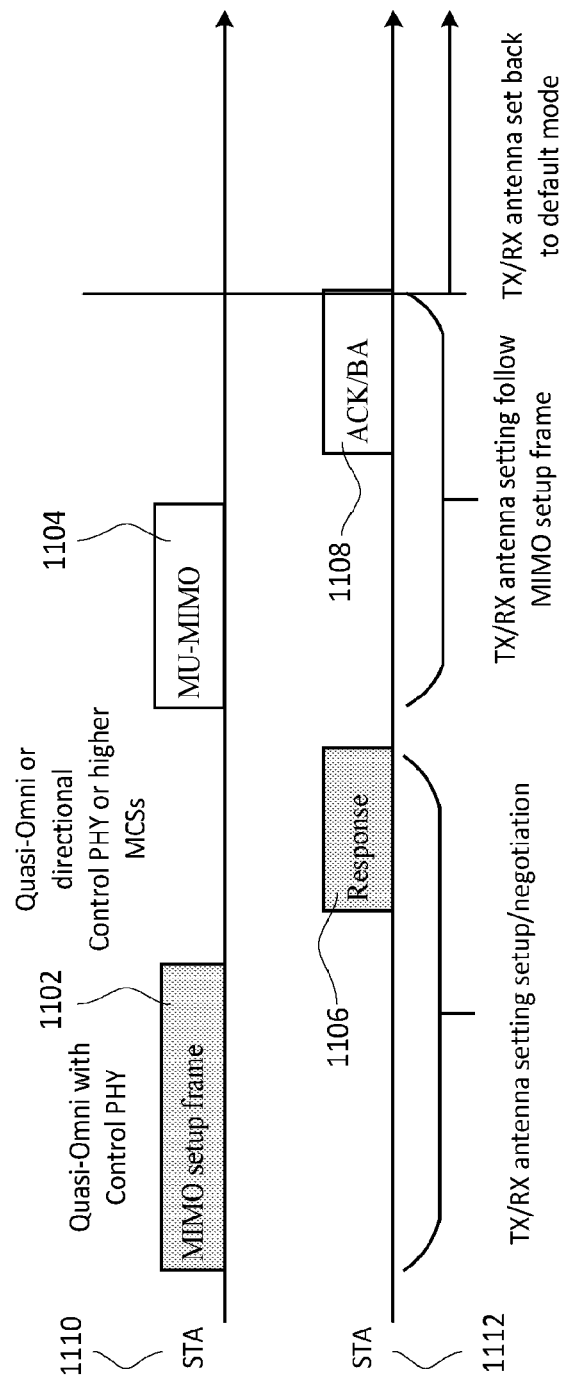
FIG. 11 illustrates an exemplary single user SU-MIMO setup implementation.

SU-MIMO setup implementations may be provided. SU-MIMO setup implementation may be shown in FIG. 11. The scheme may be considered as an example MU-MIMO setup with a (e.g., one) user. As shown in example FIG. 11, STA 1110 (for example, an AP/PCP) may transmit a MU-MIMO setup frame 1102. The MU-MIMO setup frame 1102 may be transmitted in a default multicast control frame transmission mode, e.g., basic quasi-omni mode or quasi-omni mode for single data stream transmission in type I or K quasi-omni beams in type II beam modes. STA 1112 may prepare the reception of MIMO setup frame 1102 using a default beam mode. On reception of the response frame 1106 from STA 1112, STA 1110 may transmit MU-MIMO 1104 and receive an ACK frame 1108.

Training/tracking may be performed as part of and/or with the MIMO setup implementation. An MIMO setup frame may be appended with a sounding sequence (e.g., an extra sounding sequence). For example, the MIMO setup implementation may be for channel access with an MIMO setup frame(s). The training/tracking may include extra training/tracking. The extra training/tracking may provide for additional training. The implementation herein may be applied to SU-MIMO and/or MU-MIMO.

As an example, the sounding sequence may be used for baseband/digital BF/MIMO mode adaptation/selection. For example, the MIMO setup frame may be transmitted using quasi-omni mode with a single data stream(s). The CEF field(s) (including L-CEF and EDMG-CEF field) may be designed and/or used for single-data-stream estimation. TXOP holder/an initiator of the MIMO transmission may want to know full information or partial information about an effective MIMO channel after analog beamforming. The TXOP holder/the initiator of the MIMO transmission may gain the full information or partial information about the effective MIMO channel, e.g., by appending extra known training sequences at the end of the PPDU transmission. Tx and/or Rx may use a trained analog beam(s). A responder (e.g., a receiver such as a station) may use training sequences (e.g., the extra known training sequences) to estimate the baseband MIMO channel and/or feed back information requested by the initiator (e.g., a transmitter such as an AP). With the information fed back, the initiator may decide the baseband/digital MIMO/BF mode. The MIMO response frame may be used to carry baseband channel-state information (CSI) feedback. Baseband BF/MIMO training may be combined with the MIMO setup implementations and/or improve system efficiency.

Figure 12:
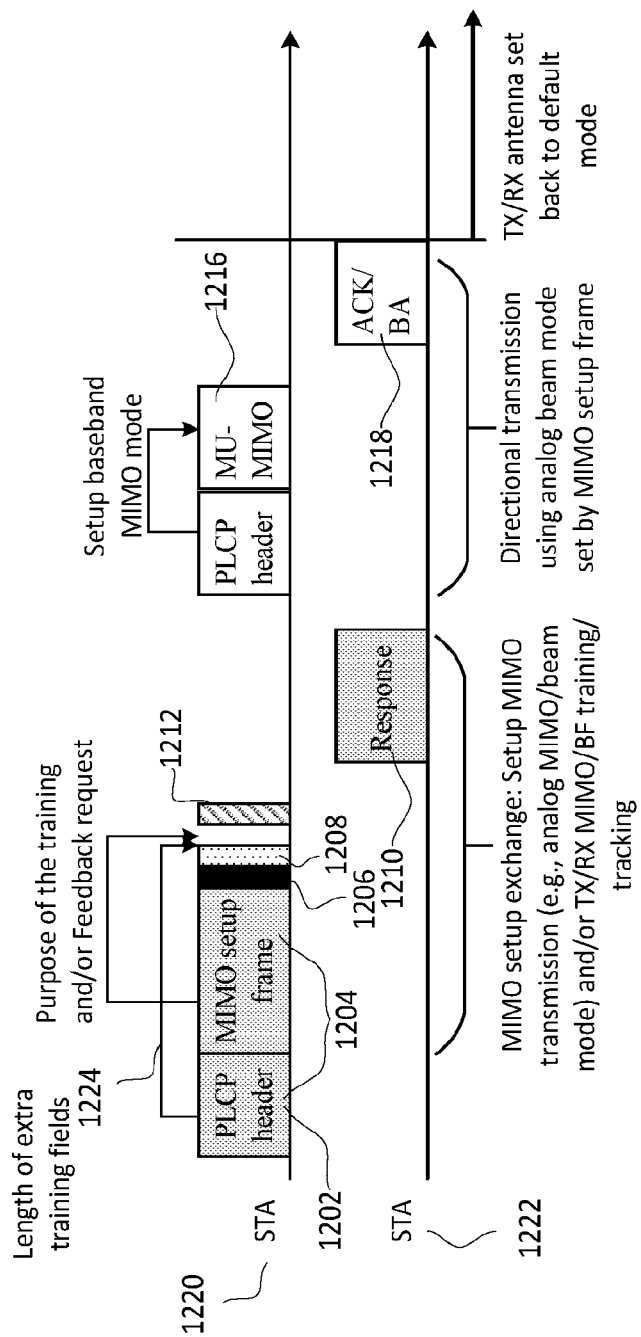
FIG. 12 illustrates an exemplary MIMO setup implementation with baseband/digital beamforming (BF)/MIMO training.

As an example of MIMO setup implementations along with extra training/tracking, the sounding sequence (e.g., the extra sounding sequence) may be used for analog beam tracking/refinement. For example, the MIMO setup frame may be transmitted using quasi-omni mode with single-data streams. The CEF field(s) (including L-CEF and EDMG-CEF field) may be designed and/or used for single-data-stream estimation. The TXOP holder/the initiator may be aware that the transmit beam(s) or the receive beam(s) or both may not be good enough. For example, a transmission(s) via the transmit beam(s) or the receive beam(s) or both may not meet certain quality criterion. The TXOP holder/the initiator may decide to perform beam tracking/refinement during the MIMO setup implementation. The extra training sequences may be used to transmit beam training, receive beam training or transmit/receive beam training. The responder (e.g., the receiver such as a station) may use the extra training sequences to determine the good beam(s) and/or bad beam(s) for the transmitter and/or the receiver. With the determination of the good beam(s) and/or bad beam(s), the initiator (e.g., a transmitter such as an AP) and the responder (e.g., the receiver such as a station) may update the analog beams. An example of MIMO setup implementation with extra training may be described herein (e.g., as shown in FIG. 12). The example of MIMO setup implementation with extra training may comprise one or more of the following.

As shown in FIG. 12, the example of MIMO setup implementation with extra training may comprise that STA 1220 (e.g., an AP/PCP) may transmit a MIMO setup frame 1204 (e.g., a MU-MIMO setup frame or a SU-MIMO setup frame). The transmission of the MIMO setup frame 1204 may comprise a PLCP header 1202. An extra training field may carry multiple training sequences (e.g., training sequence 1206, training sequence 1208, and/or training sequence 1212). The training sequences may be transmitted using different antenna/beam patterns. The training sequences may be repeated and/or transmitted using an antenna pattern (e.g., a fixed antenna/beam pattern). A receiver(s) may sweep the receiver's antenna/beam pattern to train one or more reception beams. A length of a training field (e.g., the extra training field) may extend from the PLCP header 1202 or a part of the PLCP header 1202 to the end of a training sequence (e.g., the training sequence 1208). A purpose of the training and/or the feedback request may be carried in MAC body of MIMO setup frame. In another embodiment, the purpose of the training and/or the feedback request may be carried in the PLCP header. As an example, the frame 1204 may be transmitted using legacy DMG PPDU. The header field may be detected by the legacy users. A quasi-omni antenna pattern may be used from the starting of a packet to the end of a training sequence. A packet type field in a header may be used to indicate that a packet may be appended with a TRN field (e.g., the TRN field may be appended after the data portion). A value of N in the training length field may indicate the length of the TRN field 1224. As an example, the frame may be transmitted using EDMG SU PPDU format. For example, EDGM-Header-B field may not be present in the preamble. In legacy header (L-header) field, a packet type and/or training length field may be set to indicate the presence of TRN-T field at the end of the packet. L-STF, L-LTF, L-Header and/or EDMG-Header-A fields may be transmitted using a (e.g., a single) RF chain. L-STF, L-LTF, L-Header and/or EDMG-Header-A fields may be transmitted using some or all of the RF chains. Transmission techniques (e.g., described herein) may be used.

As an example, the PLCP header 1204 may comprise an L-header. In the L-header, A packet type field may be used to indicate that the packet may be appended with a TRN field (e.g., the TRN field may be appended after the data portion). A value of N in a training length field may indicate the length of the TRN field.

As an example of the PLCP header 1204, an EDMG-Header-A may be used. In the EDMG-Header-A, the EDMG-Header-A may indicate/comprise a use immediately field. The use immediately field may be used to indicate whether the MIMO transmission (e.g., the MIMO transmission right after the MIMO setup exchanges) may use the updated analog/baseband beams or schemes, for example, the updated analog/baseband beams or schemes that are derived from the training using the extra training field appended after MIMO setup frame. The Use Immediately field may be set to 0, e.g., in the case the transmitter/receiver may not have enough time to use the updated beams or schemes. The training results may be used in later transmissions.

The EDMG-Header-A may indicate/comprise the purpose of the extra training field (e.g., EDMG-Header-A). The purpose of the extra training field may include baseband MIMO channel sounding, analog beam tracking/refinement, and/or the like. When used for analog beam tracking/refinement, the extra training filed may be used for Tx training (e.g., Tx training only) such as Tx sweeping and/or training different beams. The extra training filed may be used for Rx training (e.g., Rx training only). Tx beams may be used (e.g., fixed) and/or repeated for a certain length, which allows the Rx to sweep the Rx's beams. When used for analog beam tracking/refinement, the extra training filed may be used for a combination of Tx and Rx training. The order in which Tx and/or Rx training may be specified. For example, the Tx training may be performed first and then Rx training. The Rx training may be performed first and followed by the Tx training. The number of Tx/Rx training may be specified, e.g., if an unequal number of Tx/Rx training may be applied. For example, N1 sequences for Tx training and followed by N2 sequences for Rx training.

The EDMG-Header-A may indicate/comprise feedback type. The feedback type may comprise a limited channel state information feedback, such as average SNR/SINR feedback per Tx/Rx antenna pair. For example, STA 1220 may request average SNR or SINR feedback when STA 1220 plans to perform baseband/digital domain transmit/receive beam/polarization selection. The feedback type may comprise a full channel state information feedback per Tx/Rx antenna pair. For example, STA 1220 may request a full CSI feedback when STA 1220 plans to perform close loop precoding.

The EDMG-Header-A may indicate/comprise channel feedback resolution (e.g., a channel feedback resolution per Tx/Rx antenna pair). The channel feedback resolution may indicate a quantitation level of the feedback. For example, the channel feedback resolution may indicate (e.g., define) the number of bits that represents a real/complex value depending on the feedback type. The real/complex value may be an SNR/SINR value, or an average of SNR/SINR values. The real/complex value may comprise a delay, a time domain tap strength, a time domain tap phase, and/or the like.

The transmission of MIMO setup frame may comprise a MAC packet. The MAC packet may comprise an EDMG MAC packet. In some scenarios, e.g., the MAC packet may be carried by a DMG PPDU. The EDMG MAC packet may be partially understood by legacy users. The EDMG MAC packet may carry MIMO setup information (e.g., as described herein). The EDMG MAC packet may carry information about baseband BF training setting requirements. The information about baseband BF training setting requirements may include use immediately field. The use immediately field may be the same as used in EDMG-Header-A field. The information about baseband BF training setting requirements including a use immediately field information may be carried in a PLCP header and/or an MAC packet. The information about baseband BF training setting requirements may include a purpose of the extra training field. The field indicating the purpose of the extra training field (e.g., together with other fields) may be carried in a EDMG-Header-A field and/or MAC body.

The use immediately field may indicate/comprise channel feedback resolution (e.g., a channel feedback resolution per Tx/Rx antenna pair). The channel feedback resolution may indicate a quantitation level of the feedback. For example, the channel feedback resolution may indicate (e.g., define) the number of bits that represents a real/complex value depending on the feedback type. The real/complex value may be an SNR/SINR value, or an average of SNR/SINR values. The real/complex value may comprise a delay, a time domain tap strength, a time domain tap phase, and/or the like.

The information about baseband BF training setting requirements including the purpose of the extra training field may be carried in a PLCP header and/or am MAC packet. The information about baseband BF training setting requirements may include channel feedback type. The feedback type may be the same as used in EDMG-Header-A field. The channel feedback type may indicate/comprise channel feedback resolution (e.g., a channel feedback resolution per Tx/Rx antenna pair). The channel feedback resolution may indicate a quantitation level of the feedback. For example, the channel feedback resolution may indicate (e.g., define) the number of bits that represents a real/complex value depending on the feedback type. The real/complex value may be an SNR/SINR value, or an average of SNR/SINR values. The real/complex value may comprise a delay, a time domain tap strength, a time domain tap phase, and/or the like.

The information about baseband BF training setting requirements including channel feedback type information may be carried in PLCP header and/or MAC packet. The information about baseband BF training setting requirements may comprise channel feedback resolution per Tx/Rx antenna pair. This field may be the same as used in EDMG-Header-A field. The channel feedback resolution per Tx/Rx antenna pair may indicate/comprise channel feedback resolution (e.g., a channel feedback resolution per Tx/Rx antenna pair). The channel feedback resolution may indicate a quantitation level of the feedback. For example, the channel feedback resolution may indicate (e.g., define) the number of bits that represents a real/complex value depending on the feedback type. The real/complex value may be an SNR/SINR value, or an average of SNR/SINR values. The real/complex value may comprise a delay, a time domain tap strength, a time domain tap phase, and/or the like. The information about baseband BF training setting requirements including channel feedback resolution per Tx/Rx antenna pair may be carried in PLCP header and/or MAC packet.

The transmission of MIMO setup frame may comprise training sequences (e.g., extra training field). In the extra training field, STA 1220 may transmit training sequences, e.g., using the antennas and beams to be trained. As an example, the extra training field may be appended right after the MAC packet. In one or more of the examples herein, in order to give beamformee(s) (e.g., STA 1222 in this example) more processing time to acquire the TX antennas and beams to be used, the extra training field may be transmitted xIFS time after the end of the EDMG MAC packet transmission.

The example of MIMO setup implementation with extra training may comprise that STA 1222 may transmit a response frame 1210. STA 1222 may carry the feedback information requested by STA 1220 (e.g., in the response frame 1210). STA 1222 may perform according to a MIMO setup implementation (e.g., the MIMO setup implementation described herein). STA 1222 may send an ACK/BA 1218. The TX/RX antenna may be set back to default mode.

The example of MIMO setup implementation with extra training may comprise that STA 1220 may perform a MIMO transmission 1216 using the information updated by the feedback e.g., if use Immediately field is set. STA 1220 may use the beams and/or transmission schemes signaled (e.g., explicitly signaled) by the MIMO setup frame 1204.

In the example of MIMO setup implementation with extra training, the extra training field may be appended to the MIMO setup frame. The example of MIMO setup implementation with extra training may be extended to more general cases. For example, in any beam refinement protocol (BRP) or extended BRP frame, an extra training field(s) may be appended for a same or similar purpose, e.g., the baseband full/partial CSI sounding, the analog beam tracking/refinement etc. The signaling described here may be carried in one or more of the PLCP header of the BRP or eBRP frame, BRP or eBRP MAC packet, or MAC header.

MIMO setup frames may include various fields. An MIMO setup frame may include a common field and/or a user specific field. With SU-MIMO setup, a (e.g., one) user specific field may be present. The MIMO setup frame may include one or more fields indicating one or more of a Tx/Rx ID, Nss expected for a (e.g., each) user in the following MIMO data transmission, analog beam pattern to be used in the MIMO transmission, baseband MIMO type to be used in the MIMO transmission, setting up the response frames expected from the STA(s), and/or other information if extra training fields are appended. The field used to indicate analog beam pattern to be used in MIMO transmission may indicate or include one or more PAA information/index, polarization information/index, analog beam index, or other beam candidates. The field used to indicate baseband MIMO type to be used in MIMO transmission may indicate or comprise one or more of antenna/PAA/polarization selection, selected indices, STBC like scheme (e.g., a SFBC), dual carrier modulation or spatial/frequency/time domain dual carrier modulation, or close loop (CL) precoding, or open loop (OL) precoding. The selected indices may be signaled, e.g., before MIMO transmission. The field used to set up the response frames expected from the STA(s) may indicate or comprise one or more response frames for an MIMO setup frame, or an ACK frame for MIMO transmission. Other information if extra training fields may be appended may indicate or comprise one or more use immediately field, a purpose of the extra training field, channel feedback type, or channel feedback resolution.

When multiple streams that comprise a same legacy fields (e.g., legacy Short Training Field (STF), channel estimation field (CEF), and Header) are transmitted from multiple antennas, unintentional beamforming may occur on the received signal due to a strong correlation between transmitted signals. A variation of received signal power may cause suboptimal AGC setting to decode a legacy header at legacy devices. Different cyclic shift may be applied to a transmitted signal, for example, to decorrelate the transmit signals. An operation of applying different cyclic shift to a transmitted signal may be compatible with cyclic prefix (CP)-OFDM transmissions.

Figure 13A:
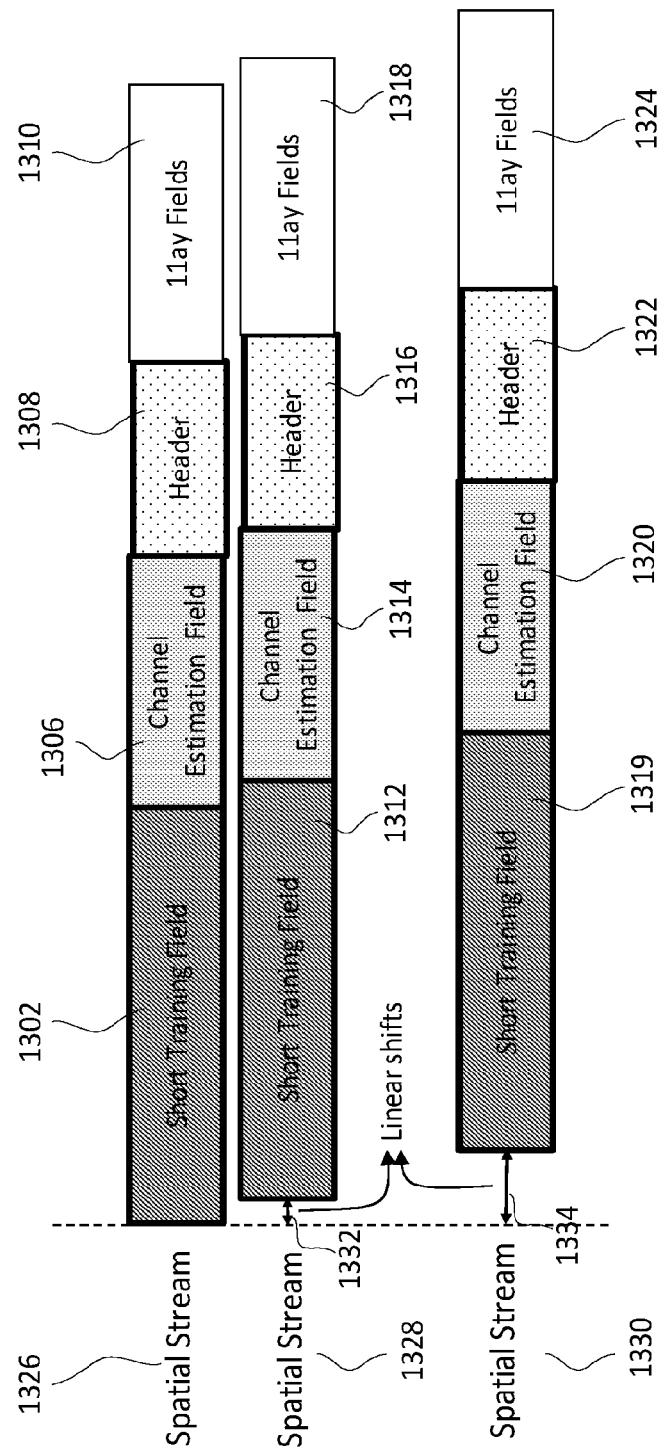
FIG. 13A illustrates Linear shift techniques for avoiding unintentional beamforming.
Figure 13B:
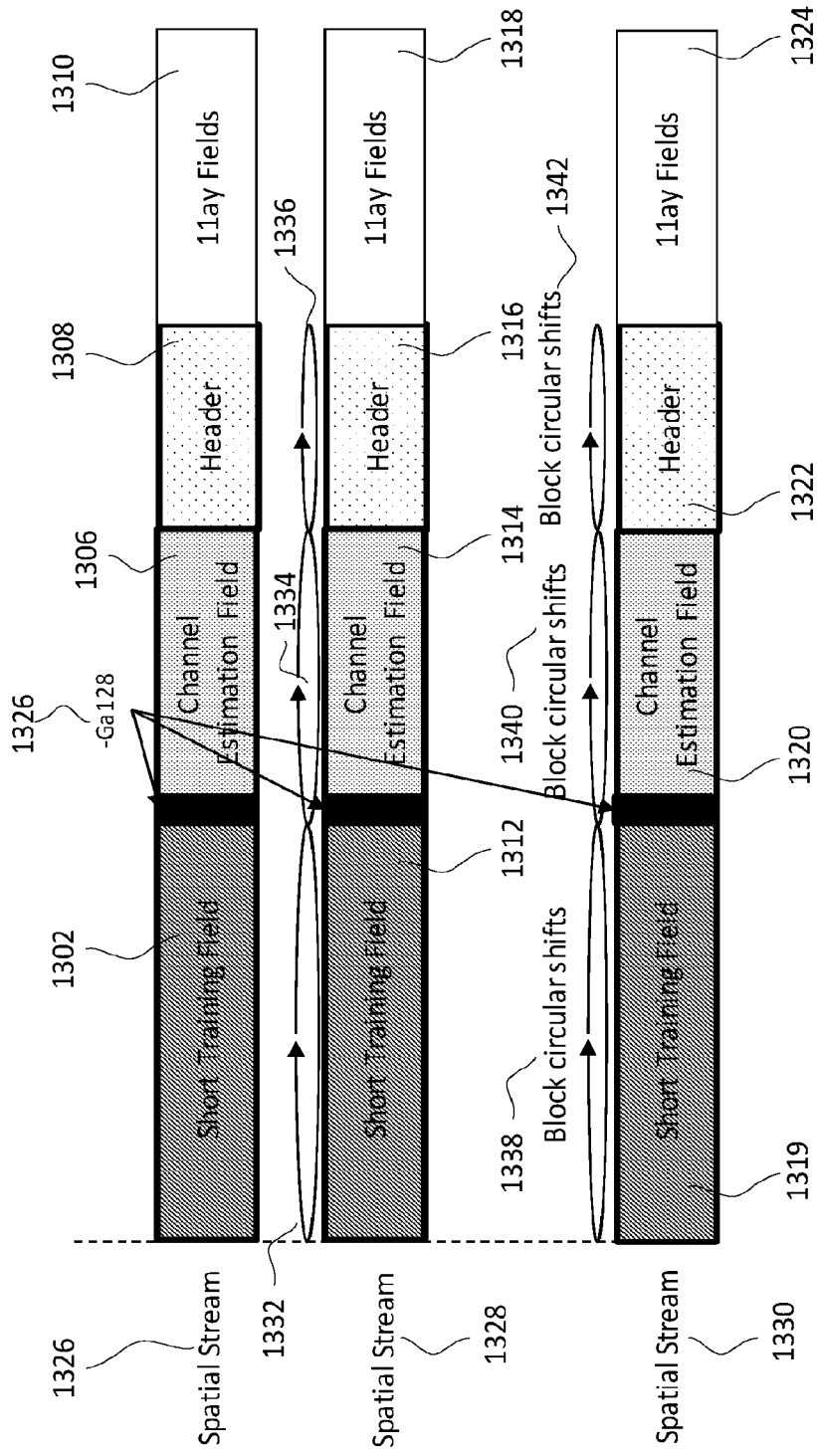
FIG. 13B illustrates techniques for avoiding unintentional beamforming block-based shift which include some or all legacy fields.
Figure 13C:
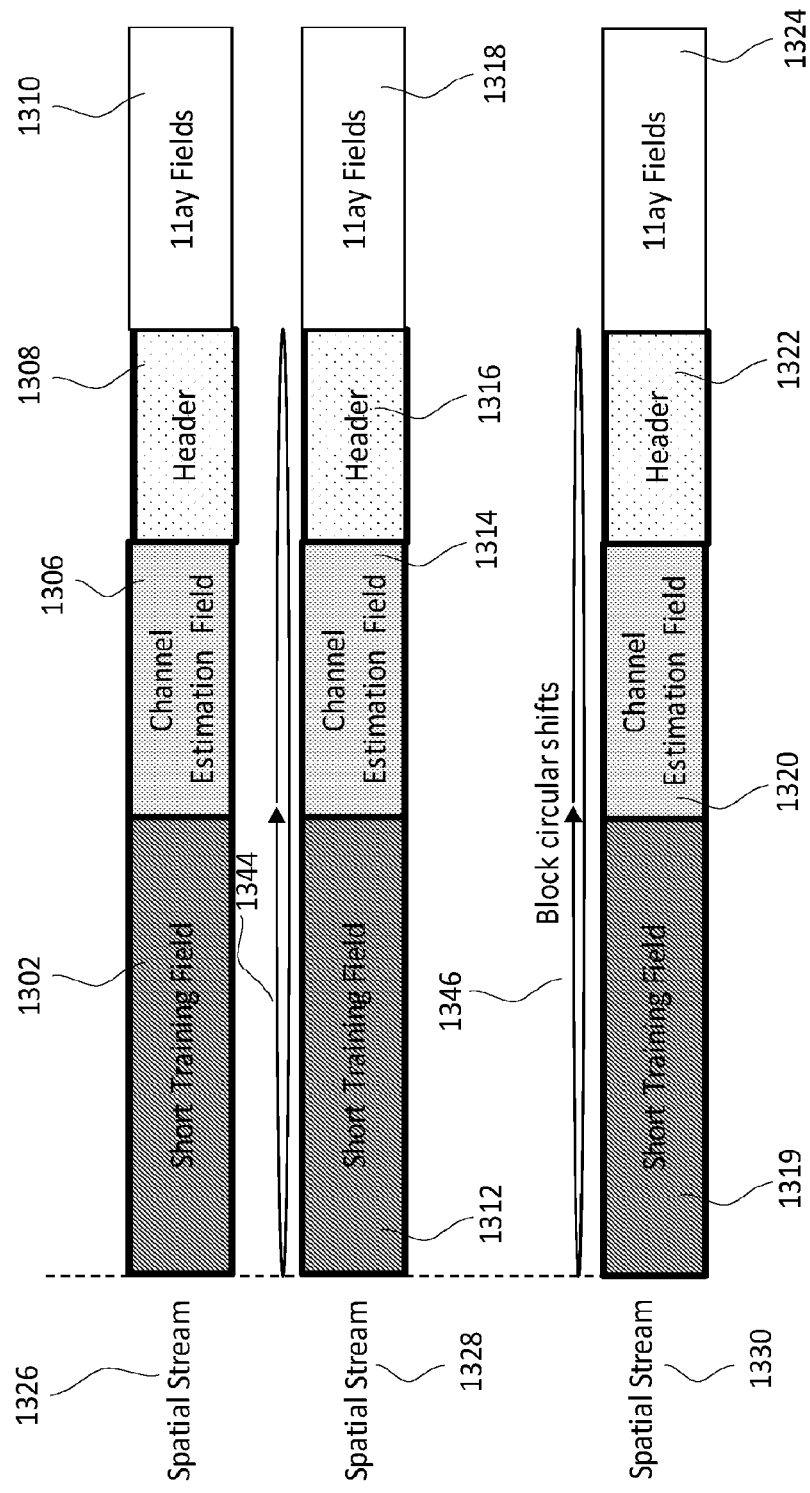
FIG. 13C illustrates techniques for avoiding unintentional beamforming block-based shift considering the subfields and their purposes.

MIMO transmission implementations for preamble may be used, for example to reduce unintentional beamforming. Several techniques may be provided for single carrier waveforms such as linear shifts and block-based circular shifts. A choice of techniques (e.g., as shown in FIG. 13A-13C) may enable interference-free channel estimation for a legacy device.

For example, for linear shifts, the transmitter may intentionally shift the spatial streams transmitted through different antennas. Single carrier waveforms (e.g., upon linear shifting) may not be aligned at the receiver and/or may avoid unintentional beamforming. The transmitter may apply block-based circular shifts. For example, the legacy fields of the PPDU may be circularly shifted. One or more legacy fields (e.g., as described herein) may be or include pre-EDMG modulated fields. The pre-EDMG modulated fields may include legacy STF field, legacy CEF fields and headers. A circular shift may be applied to STF, CEF, and/or header that are grouped. In one or more examples herein, the circular shift may be applied to specific group of fields or subfields (e.g., particular Golay sequences). For instance, as illustrated in FIG. 13, spatial stream 1326 may include a short training field 1302, a channel estimation field 1306, a header 1308, and other 11ay fields 1310. Spatial stream 1328 may include a short training field 1312, a channel estimation field 1314, a header 1316 and other 11ay fields 1318. Spatial stream 1328 may include a short training field 1312, a channel estimation field 1314, a header 1316, and other 11ay fields 1318. Spatial stream 1330 may include a short training field 1319, a channel estimation field 1320, a header 1322, and other 11ay fields 1324. FIG. 13A may show an example of the linear shift. The spatial stream 1326 may have been linearly shifted from the spatial stream 1328 (e.g., shown in 1332). The spatial stream 1328 may have been linearly shifted from the spatial stream 1330 (e.g., shown in 1334).

The transmitter may apply block-based circular shifts. For example, legacy fields of the PPDU may be circularly shifted. STF, CEF, and/or header may be grouped, and/or a circular shift may be applied to the group. A circular shift may be applied to STF, CEF, and/or header that are grouped. In one or more examples herein, the circular shift may be applied to a selected (e.g., a specific) group of fields or subfields (e.g., Golay sequences). The grouping may consider one or more of a STF(s) excluding the Golay sequence (e.g., −Ga128) in the end of the STF(s), a CEF(s) including the Golay sequence (e.g., −Ga128) in the end of the STF(s), or a header. As shown in FIG. 13B, the grouping may consider a STF(s) excluding the Golay sequence (e.g., −Ga128) in the end of the STF(s). For spatial stream 1328, the block shift of the STF(s) excluding the Golay sequence (e.g., −Ga128) in the end of the STF(s) may be shown in the block circular shifts 1332. For spatial stream 1330, the block shift of the STF(s) excluding the Golay sequence (e.g., −Ga128) in the end of the STF(s) may be shown in the block circular shifts 1338. As shown in FIG. 13B, the grouping may consider a CEF(s) including the Golay sequence (e.g., −Ga128) in the end of the STF(s). For spatial stream 1328, the block shift of the a CEF(s) including the Golay sequence (e.g., −Ga128) in the end of the STF(s) may be shown in the block circular shifts 1334. For spatial stream 1330, the block shift of the a CEF(s) including the Golay sequence (e.g., −Ga128) in the end of the STF(s) may be shown in the block circular shifts 1340. As shown in FIG. 13B, the grouping may consider a header. For spatial stream 1328, the block shift of the header may be shown in the block circular shifts 1336. For spatial stream 1330, the block shift of the header may be shown in the block circular shifts 1342.

Figure 15A:
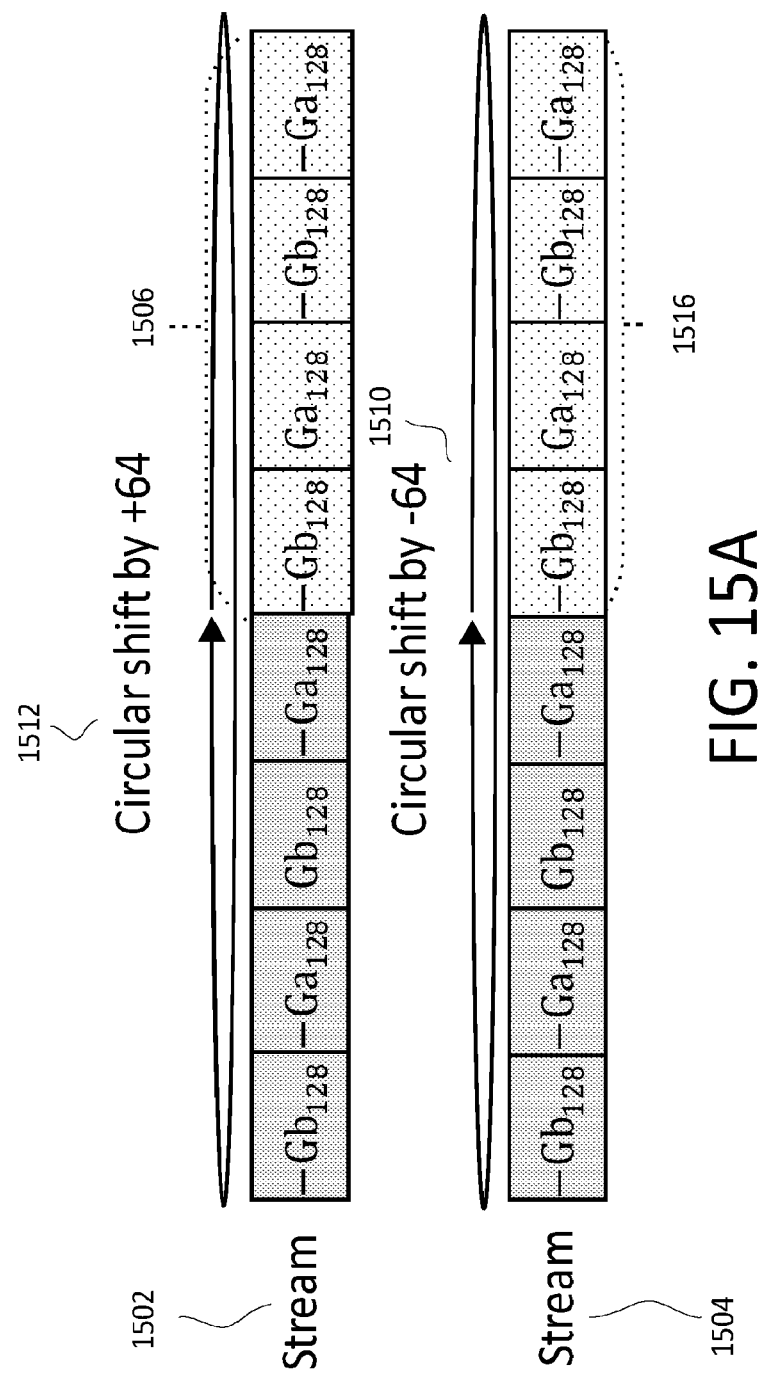
FIG. 15A illustrates circularly shifted CEFs for two streams.
Figure 15B:
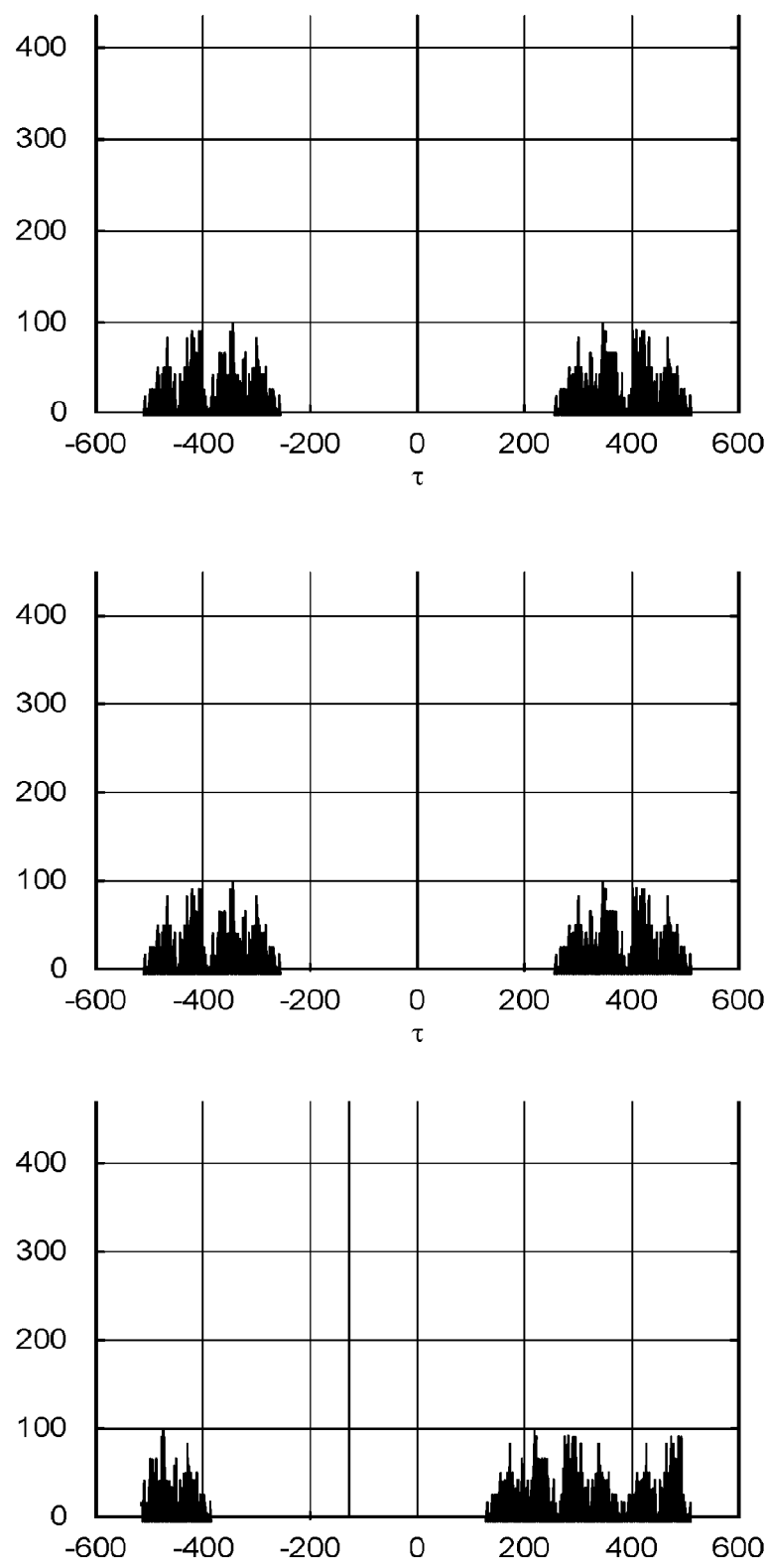
FIG. 15B illustrates circularly shifted CEFs for two streams and auto/cross correlation results.

The block-based shift may consider subfields and purposes of the subfields. FIG. 13C may show an example of the block-based shift considering the purposes of the subfields. For spatial stream 1328, the block shifts 1344 may consider the purposes of the subfields 1312-1316. For spatial stream 1330, the block shifts 1346 may consider the purposes of the subfields 1319-1322. A choice of techniques for avoiding unintentional beamforming block-based shift (e.g., as shown in FIG. 15B) may enable interference-free channel estimation for the legacy device.

Figure 14:
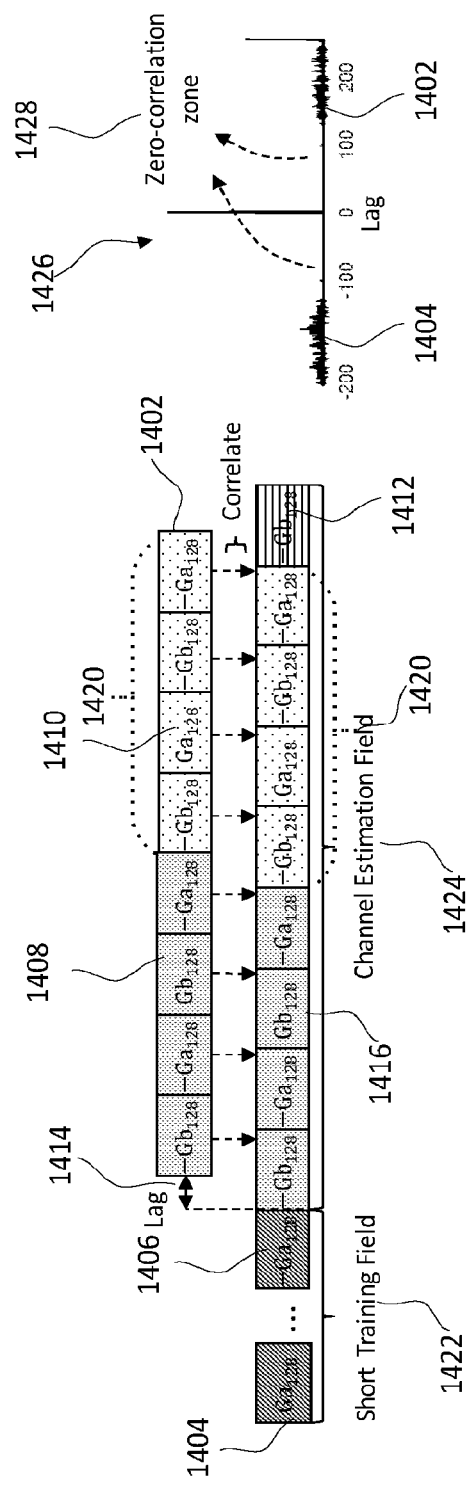
FIG. 14 illustrates channel estimation operation in 802.11ad with channel estimation field (CEF). CEF includes Golay sequence denoted as Ga128 and Gb128.

Circular CEFs may be used for multiple streams (e.g., stream 1402 and stream 1404). In IEEE 802.11ad, the sequence in the CEF may introduce a property zero autocorrelation zone, which may enable the channel estimation in time domain via correlation operations as illustrated in FIG. 14. As shown in FIG. 14, two streams, stream 1402 and stream 1404 may share a zero correlation zone 1420. Stream 1404 may include a short training field 1422, a channel estimation filed 1424, and a –Gb128 1412. The –Gb128 1412 may be used as a guard. The short training field 1422 may include a number of –Ga128 including –Ga128 1406. The channel estimation filed 1424 may include a number of Ga128s and –Gb128s (e.g., Gb128 1416). Stream 1404 may include the zero autocorrelation zone 1420. Stream 1402 may include a number of Ga128 and –Gb128 (e.g., –Gb128 1408) including the number of Ga128s and –Gb128 included in the zero autocorrelation zone 1420. The zero autocorrelation zone 1420 may include Ga128 1410. Stream 1402 may lag stream 1404, as shown in the lag 1414.

As shown in graph 1426, the x axis refers to the lag, and the y axis refers to energy. In an embodiment, y axis may refer to correlation. Along x-axis between stream 1402 and stream 1404, the energy remains low (e.g., towards or at zero energy), indicating a zero autocorrelation zone 1428.

As an example, the zero correlation zone (e.g., 1506 for stream 1502 and 1516 for stream 1504)) may be shared with more than one streams (e.g., stream 1502 and stream 1504) to enable channel estimation for different streams (e.g., stream 1502 and stream 1504). For example, two orthogonal CEFs may be generated by circularly shifting the original CEF of 802.11ad or any other sequence with zero autocorrelation zone including the sequence with full zero autocorrelation zone (e.g., Zadoff-chu sequence). The orthogonal CEFs may be generated if the shifts (e.g., circuit shift 1510 and 1512) are by −64 and +64 at least as illustrated in FIG. 15A. FIG. 15B may show various auto/cross correlation results, for example, based on the implementation from FIG. 15A.

Since sequences 1502 and 1504 are derived from the original sequences 1402 and 1404 by using circular or linear shifts, the sequences 1502 and 1504 may maintain the same zero auto-correlation zone as shown in FIG. 14. For example, the zero auto-correlation zone 1420 is the same as the zero auto-correlation zone 1506. The sequences 1502 and 1504 may be mutually orthogonal to each other (e.g., +−64 sample shifts). Similar techniques may be extended to multibeam training purposes, e.g., by introducing smaller circular shift values.

A step-wise implementation may be used for multi-stream support. Multiple STAs, for example, a pair of STAs, e.g., an EDMG AP/PCP and a EDMG STA, or two EDMG STAs. A step-wise implementation may be used to establish transmission and/or reception of multiple data streams among them. The pair of STAs may include an EDMG AP/PCP and a EDMG STA, or two EDMG STAs. An example of the step-wise implementation may include one or more of the following.

The step-wise implementation may comprise a STA, e.g., an EDMG AP/PCP or an EDMG STA, that may use a quasi-omni beam to conduct initial transmissions with another STA.

The step-wise implementation may comprise that, after the initial quasi-omni transmissions, the STA pair may proceed to conduct beam training, e.g., using SLS or BRP. During the SLR and BRP, one or more TX Sectors and/or one or more of RX Sectors may be selected. If the STAs are equipped with multiple PAAs, the STAs may conduct SLS and/or BRP concurrently using different PAAs. The SLS and/or BRP patterns may be such that the different PAAs on the transmitting STA may not overlap in beam (e.g., a coverage of the beam(s) may not be overlapped) and the different PAAs on the receiving STA may not overlap in beam. Different PAAs on the transmitting STA may transmit using orthogonal signaling, such as using orthogonal codes or set of subcarriers. The orthogonal signaling may carry identifications of the different PAAs. The receiving STA may use a different PAA to decode the orthogonal signaling, and/or identifying from which transmitting PAA from which the received signal is received. Using the concurrent transmission and/or reception among multiple PAAs, multiple (e.g., the pair of) STAs may select one or more Tx Sectors and one or more Rx Sectors, which may be associated with one or more PAAs on the transmitting and receiving STAs. The set of Tx sectors and Rx sectors, which may be associated with multiple PAAs, may be used to establish MIMO transmissions among multiple (e.g., between the pair of the STAs).

The step-wise implementation may comprise that, if one or more Tx sectors and Rx sectors are selected, which may be associated with different PAAs on the pair of the STAs, a STA (e.g., one of the STAs), for example an EDMG AP/PCP or EDMG STA, may request higher number of data streams. For one or more Tx/Rx sector pairs, the STA may request polarization training, for example, in order to transmit higher number of streams using the one or more Tx/Rx sector pair. The requesting STA(s) may indicate requested polarization type, such as circular, linear, mixed, vertical, horizontal. The requesting STA(s) may express the requested polarization type, for example, using Euler angle relative to a (e.g., an existing) polarization or to a coordination system. The requesting STA (e.g., a transmitter such as an AP) and the responding STA (e.g., a receiver such as a STA) may conduct polarization training for the requested polarization type. The responding STA may provide feedback for the polarization training. The requesting STA may request polarization mode change. The requesting STA may request the polarization mode change by adding additional streams. The additional streams may be transmitted using a different polarization type, for example to provide higher number of data streams using the same Tx/Rx sector pair.

The step-wise implementation may comprise that, if a requesting STA uses higher/lower data rate, the requesting STA may request to use wider or narrow channel bands, for example, more or less subcarriers. If the responding STA is capable of wider channel transmissions, the responding STA may respond affirmatively. Multiple STAs (e.g., the pair of STAs) may use wider or narrow channel for one or more of Tx/Rx sectors subsequently.

Although the features and elements of the present invention are described in the preferred embodiments in particular combinations, each feature or element can be used alone without the other features and elements of the preferred embodiments or in various combinations with or without other features and elements of the present invention. Although the solutions described herein consider 802.11 specific protocols, it is understood that the solutions described herein are not restricted to this scenario and are applicable to other wireless systems.

Figure 16A:
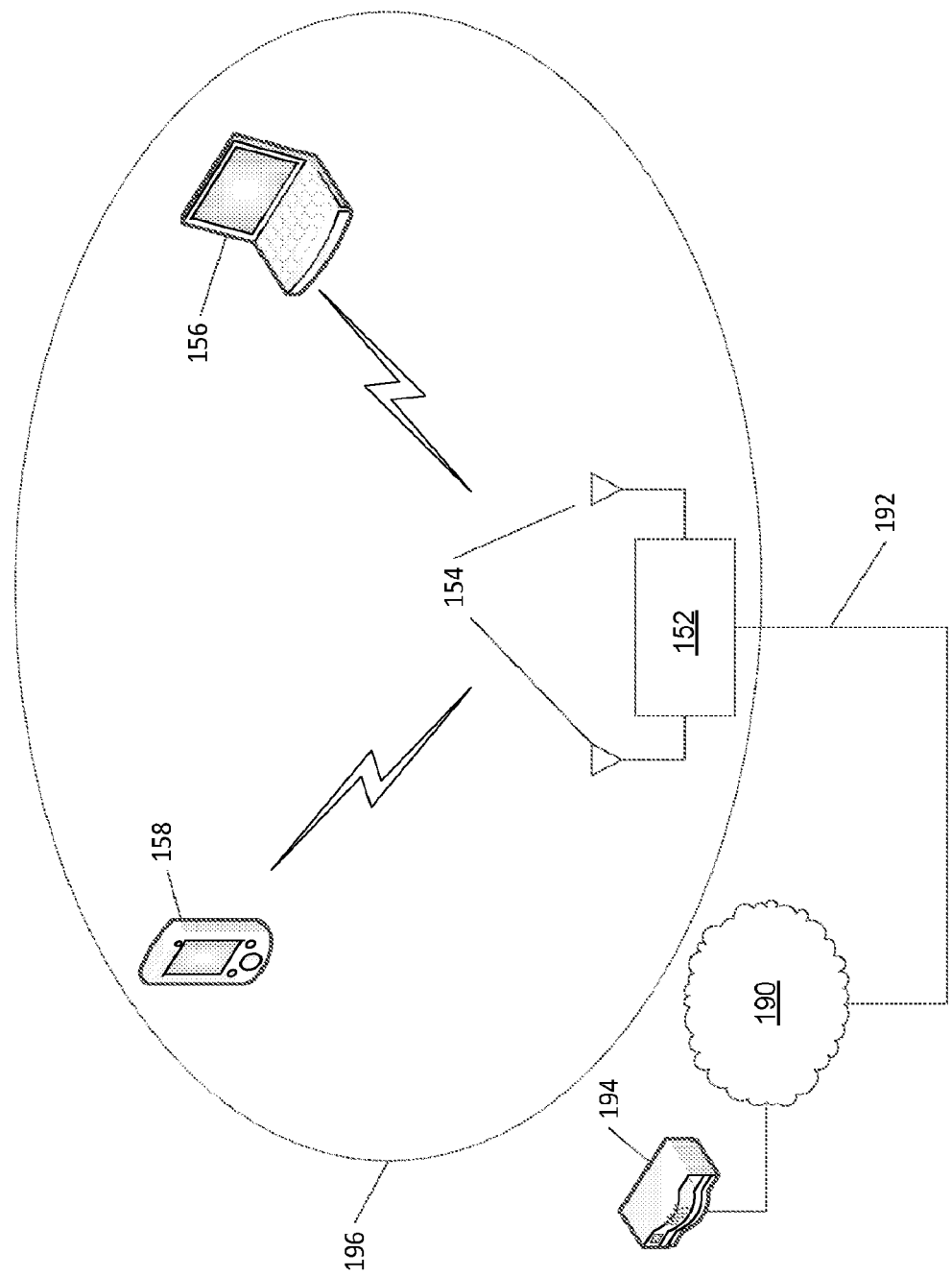
FIG. 16A illustrates exemplary wireless local area network (WLAN) devices.

FIG. 16A illustrates exemplary wireless local area network (WLAN) devices. One or more of the devices may be used to implement one or more of the features described herein. The WLAN may include, but is not limited to, access point (AP) 102, station (STA) 110, and STA 112. STA 110 and 112 may be associated with AP 102. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA 110, and STA 112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA 110) may have traffic intended for a destination STA (e.g., STA 112). STA 110 may send the traffic to AP 102, and, AP 102 may send the traffic to STA 112.

A WLAN may operate in an ad-hoc mode. The ad-hoc mode WLAN may be referred to as independent basic service set (IBBS). In an ad-hoc mode WLAN, the STAs may communicate directly with each other (e.g., STA 110 may communicate with STA 112 without such communication being routed through an AP).

IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 106 in FIG. 16A), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 16A. The processor may be configured to execute processor executable code (e.g., instructions) including, for example, software and/or firmware instructions. For example, the processer may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processer. The processer may communicate with one or more entities of memory, e.g., via a system bus, directly, etc.

Figure 16B:
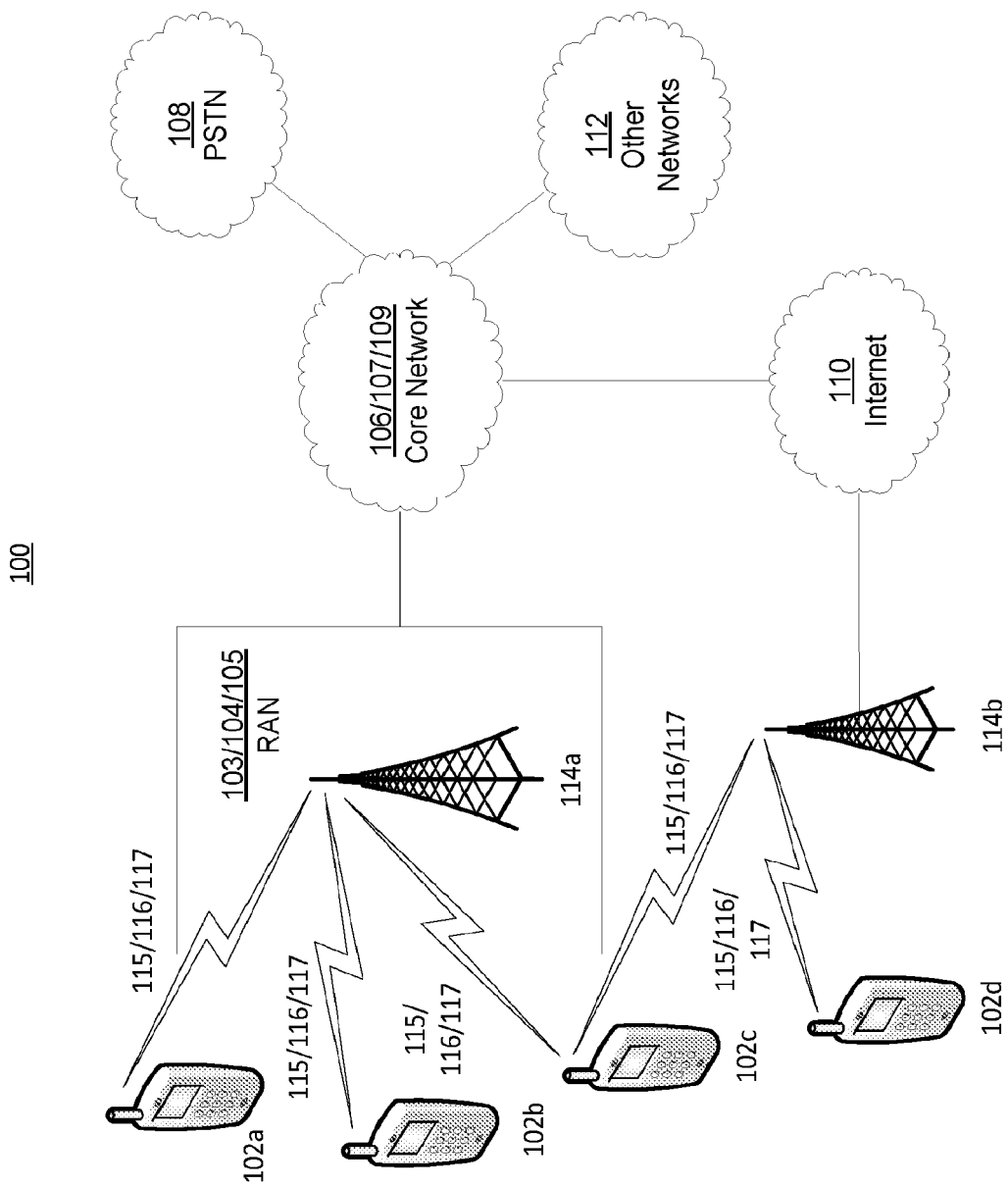
FIG. 16B is a diagram of an example communications system in which one or more disclosed features may be implemented.

FIG. 16B is a diagram of an example communications system 100 in which one or more disclosed features may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 16B, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station (e.g., a WLAN STA), a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 16B may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 16B, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 16B, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 16B may be configured to communicate with the base station 114a, which may employ a cellular-based radio technology, and with the base station 114b, which may employ an IEEE 802 radio technology.

Figure 16C:
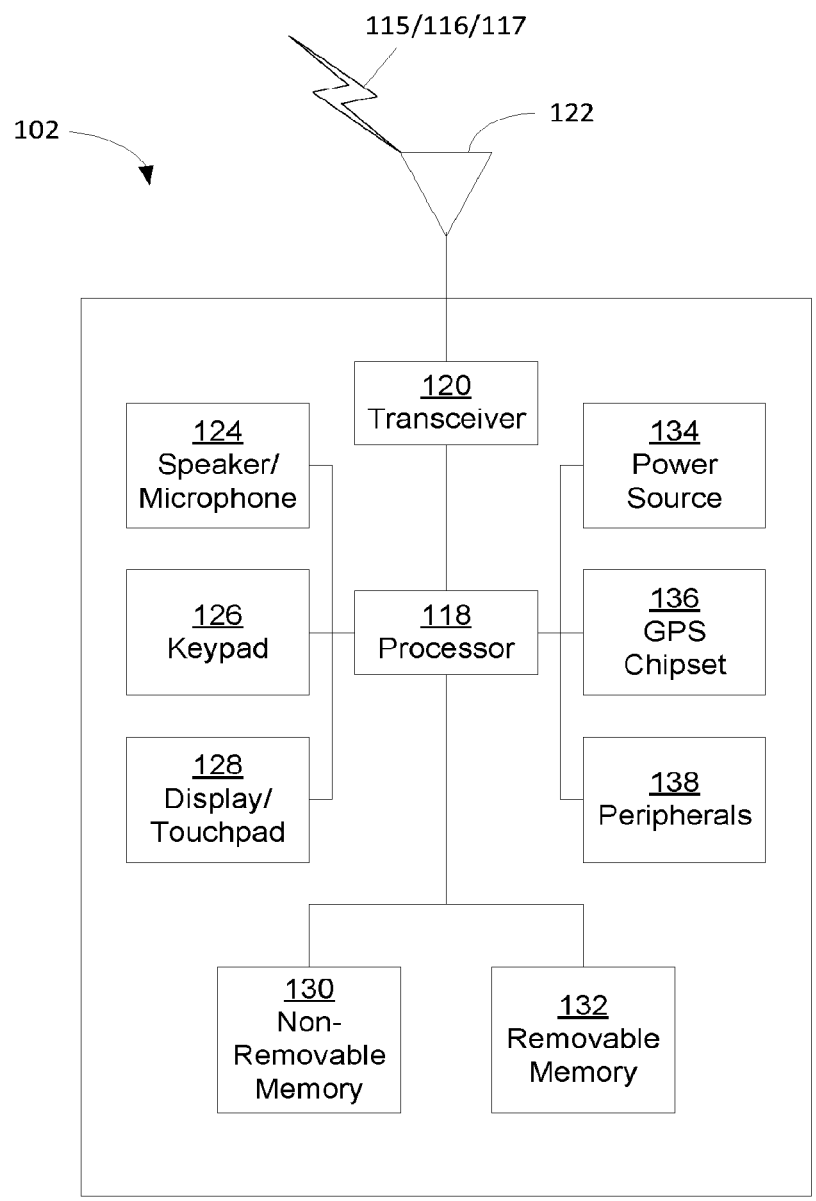
FIG. 16C depicts an exemplary wireless transmit/receive unit, WTRU.

FIG. 16C depicts an exemplary wireless transmit/receive unit, WTRU 102. A WTRU may be a user equipment (UE), a mobile station, a WLAN STA, a fixed or mobile subscriber unit, a pager, a cellular telephone, a personal digital assistant (PDA), a smartphone, a laptop, a netbook, a personal computer, a wireless sensor, consumer electronics, and the like. WTRU 102 may be used in one or more of the communications systems described herein. As shown in FIG. 16C, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 16C depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 16C as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Although features and elements may be described above in particular combinations or orders, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A station (STA) configured for multi-user multiple-input multiple-output (MU-MIMO) communications, the STA comprising:
   a processor; and
   transmitter circuitry configured to transmit a MU-MIMO setup frame to a group of responder STAs comprising at least a first responder STA and a second responder STA, wherein the MU-MIMO setup frame indicates first antennas for MU-MIMO transmissions from the STA to the first responder STA and second antennas for MU-MIMO transmissions from the STA to the second responder STA;
   the transmitter circuitry configured to transmit first MU-MIMO transmissions to the first responder STA based on the indication of the first antennas and second MU-MIMO transmissions to the second responder STA based on the indication of the second antennas.

2. The STA of claim 1, wherein the indication of the first antennas comprises an indication of a first set of radio frequency (RF) chains, and the indication of the second antennas comprises an indication of a second set of RF chains.

3. The STA of claim 1, wherein the indication of the first antennas comprises an indication of a first set of virtual antennas, and the indication of the second antennas comprises an indication of a second set of virtual antennas.

4. The STA of claim 1, wherein a first number of spatial streams comprising the first MU-MIMO transmissions is different from a second number of spatial streams comprising the second MU-MIMO transmissions.

5. The STA of claim 1, wherein the MU-MIMO setup frame comprises an enhanced directional multi-gigabit (EDMG) MU-MIMO setup frame.

6. The STA of claim 1, wherein the MU-MIMO setup frame comprises a medium access control (MAC) frame.

7. The STA of claim 1, wherein the STA comprises an access point (AP).

8. The STA of claim 1, further configured to transmit an end frame to a responder STA of the group.

9. The STA of claim 1, further configured to transmit an end frame to a responder STA of the group on a condition that the STA does not receive a response frame from the responder STA of the group in response to MU-MIMO transmissions.

10. The STA of claim 1, wherein the group comprises a third responder STA; and the MU-MIMO setup frame indicates third antennas for MIMO transmissions from the STA to the third responder STA.

11. A method for multi-user multiple-input multiple-output (MU-MIMO) communications implemented in a station (STA), the method comprising:
   transmitting, by transmitter circuitry of the STA, a MU-MIMO setup frame to a group of responder STAs comprising at least a first responder STA and a second responder STA, wherein the MU-MIMO setup frame indicates first antennas for MU-MIMO transmissions from the STA to the first responder STA and second antennas for MU-MIMO transmissions from the STA to the second responder STA; and
   transmitting, by the transmitter circuitry, first MU-MIMO transmissions to the first responder STA based on the indication of the first antennas and second MU-MIMO transmissions to the second responder STA based on the indication of the second antennas.

12. The method of claim 11, wherein the indication of the first antennas comprises an indication of a first set of radio frequency (RF) chains, and the indication of the second antennas comprises an indication of a second set of RF chains.

13. The method of claim 11, wherein the indication of the first antennas comprises an indication of a first set of virtual antennas, and the indication of the second antennas comprises an indication of a second set of virtual antennas.

14. The method of claim 11, wherein a first number of spatial streams comprising the first MU-MIMO transmissions is different from a second number of spatial streams comprising the second MU-MIMO transmissions.

15. The method of claim 11, wherein the MU-MIMO setup frame comprises an enhanced directional multi-gigabit (EDMG) MU-MIMO setup frame.

16. The method of claim 11, wherein the MU-MIMO setup frame comprises a medium access control (MAC) frame.

17. The method of claim 11, wherein the STA comprises an access point (AP).

18. The method of claim 11, further comprising transmitting an end frame to a responder STA of the group.

19. The method of claim 11, further comprising transmitting an end frame to a responder STA of the group on a condition that the STA does not receive a response frame from the responder STA of the group in response to MU-MIMO transmissions.

20. The method of claim 11, wherein the group comprises a third responder STA; and the MU-MIMO setup frame indicates third antennas for MIMO transmissions from the STA to the third responder STA.

* * * * *